(12) United States Patent
Malina et al.

(10) Patent No.: US 10,587,689 B2
(45) Date of Patent: Mar. 10, 2020

(54) DATA STORAGE DEVICE WITH EMBEDDED SOFTWARE

(71) Applicant: Western Digital Technologies, Inc., Irvine, CA (US)

(72) Inventors: James N. Malina, Irvine, CA (US); Benixon Arul Dhas, Irvine, CA (US); Albert H. Chen, Redmond, WA (US)

(73) Assignee: Western Digital Technologies, Inc., San Jose, CA (US)

(*) Notice: Subject to any disclaimer, the term of this patent is extended or adjusted under 35 U.S.C. 154(b) by 102 days.

(21) Appl. No.: 14/621,314

(22) Filed: Feb. 12, 2015

(65) Prior Publication Data
US 2015/0237138 A1 Aug. 20, 2015

Related U.S. Application Data

(60) Provisional application No. 61/940,313, filed on Feb. 14, 2014, provisional application No. 61/940,269, filed on Feb. 14, 2014.

(51) Int. Cl.
| | |
|---|---|
| *H01L 29/08* | (2006.01) |
| *G11B 5/012* | (2006.01) |
| *G06F 3/06* | (2006.01) |
| *G06F 11/20* | (2006.01) |
| *H04L 29/08* | (2006.01) |
| *G11B 27/32* | (2006.01) |

(Continued)

(52) U.S. Cl.
CPC ........ *H04L 67/1097* (2013.01); *G06F 3/0604* (2013.01); *G06F 3/067* (2013.01); *G06F 3/0643* (2013.01); *G06F 3/0667* (2013.01); *G06F 3/0673* (2013.01); *G06F 11/1464* (2013.01); *G06F 11/2053* (2013.01); *G06F 11/30* (2013.01); *G11B 5/012* (2013.01); *G11B 20/10527* (2013.01); *G11B 27/327* (2013.01); *G11B 27/36* (2013.01)

(58) Field of Classification Search
CPC ...... G05B 19/2642; G05B 2219/25011; G05B 2219/25329; H04L 67/1095; G11B 5/012
USPC .......................................................... 709/217
See application file for complete search history.

(56) References Cited

U.S. PATENT DOCUMENTS

| | | | | |
|---|---|---|---|---|
| 7,200,716 B1* | 4/2007 | Aiello | ................... | G06F 3/0607 709/226 |
| 7,594,002 B1* | 9/2009 | Thorpe | ................... | H04L 47/10 370/392 |

(Continued)

OTHER PUBLICATIONS

International Search Report and Written Opinion dated Apr. 28, 2015 from related PCT Serial No. PCT/US2015/015877, 13 pages.

(Continued)

*Primary Examiner* — Backhean Tiv
*Assistant Examiner* — Jonathan A Sparks
(74) *Attorney, Agent, or Firm* — Knobbe Martens Olson & Bear LLP

(57) ABSTRACT

A Data Storage Device (DSD) includes a Non-Volatile Memory (NVM) for storing data and a first processor configured to execute a firmware for retrieving data from the NVM and storing data in the NVM. A second processor of the DSD executes an application Operating System (OS) to interface with the first processor. The second processor sends a command to the first processor using the application OS to retrieve data from the NVM or store data in the NVM.

38 Claims, 15 Drawing Sheets

(51) Int. Cl.
    *G11B 27/36*    (2006.01)
    *G11B 20/10*    (2006.01)
    *G06F 11/14*    (2006.01)
    *G06F 11/30*    (2006.01)

(56) References Cited

U.S. PATENT DOCUMENTS

| | | | |
|---|---|---|---|
| 7,814,554 B1* | 10/2010 | Ragner | G06F 21/52 |
| | | | 713/165 |
| 7,991,849 B1 | 8/2011 | Ponomarenko | |
| 8,341,337 B1 | 12/2012 | Ong et al. | |
| 8,386,704 B2 | 2/2013 | Hall | |
| 9,268,806 B1 | 2/2016 | Kesselman | |
| 9,298,521 B1 | 3/2016 | Feldman et al. | |
| 9,621,653 B2 | 4/2017 | Chen et al. | |
| 2002/0083120 A1* | 6/2002 | Soltis | G06F 3/0605 |
| | | | 709/200 |
| 2003/0233385 A1 | 12/2003 | Srinivasa et al. | |
| 2005/0154841 A1 | 7/2005 | Sastri et al. | |
| 2005/0270063 A1 | 12/2005 | Cornett | |
| 2006/0282709 A1 | 12/2006 | Shu et al. | |
| 2007/0022147 A1 | 1/2007 | Bean et al. | |
| 2008/0109594 A1 | 5/2008 | Grossgold et al. | |
| 2009/0077572 A1* | 3/2009 | Andjelic | H04L 49/90 |
| | | | 719/321 |
| 2009/0204872 A1 | 8/2009 | Yu et al. | |
| 2009/0248976 A1* | 10/2009 | Rotithor | G06F 9/5016 |
| | | | 711/113 |
| 2010/0002564 A1 | 1/2010 | Colligan | |
| 2010/0070961 A1 | 3/2010 | Auer et al. | |
| 2010/0094847 A1* | 4/2010 | Malan | G06F 17/30893 |
| | | | 707/705 |
| 2011/0225352 A1 | 9/2011 | Duran | |
| 2012/0036287 A1 | 2/2012 | Lee | |
| 2012/0330894 A1 | 12/2012 | Slik | |
| 2013/0031302 A1 | 1/2013 | Byom et al. | |
| 2013/0036234 A1 | 2/2013 | Pazos et al. | |
| 2013/0067147 A1 | 3/2013 | Okita | |
| 2013/0166568 A1 | 6/2013 | Binkert et al. | |
| 2013/0191555 A1 | 7/2013 | Liu | |
| 2014/0047062 A1* | 2/2014 | Krueger | H04L 67/2842 |
| | | | 709/216 |
| 2014/0059278 A1 | 2/2014 | Schuh et al. | |
| 2014/0115240 A1 | 4/2014 | Jin et al. | |
| 2014/0126384 A1 | 5/2014 | Feng et al. | |
| 2015/0006716 A1 | 1/2015 | Suchter et al. | |
| 2015/0058583 A1 | 2/2015 | Baldwin et al. | |

OTHER PUBLICATIONS

International Search Report and Written Opinion dated Apr. 20, 2015 from related PCT Serial No. PCT/US2015/015872, 17 pages.
Acharya, et al., "Active Disks: Programming Model, Algorithms and Evaluation," http://www.nsic.org/nasd/1998-jun/gray.pdf, Jun. 1998, pp. 1-11.
"Processors," Arm the Architecture for the Digital World, http://www.arm.com/products/processors/, downloaded Dec. 4, 2013, pp. 1-3.
Tech Insight, "The Seagate Kinetic Open Storage Vision," http://www.seagate.com/tech-insights/kinetic-vision-how-seagate-new-developer-tools-meets-the needs-of-cloud-storage-platforms-master-ti/, downloaded Dec. 4, 2013, pp. 1-6.
"Linux on Cortex-M3," http://www.arm.com/community/software-enablement/linux.php, dated Dec. 19, 2011, pp. 1-6.
Extended European Search Report, dated Sep. 14, 2017, from counterpart European Application No. 15749299.2, 7 pages.
Extended European Search Report, dated Sep. 14, 2017 from related European Application No. 15749332.1. 9 pages.
Gallagher, "Seagate introduces a new drive interface: Ethernet", Ars Technica, Oct. 28, 2013, available at: https://arstechnica.com/information-technology/2013/10/seagate-introduces-a-new-drive-interface-ethernet/.
Malina et al., co-pending U.S. Appl. No. 14/484,493, filed Apr. 11, 2017 entitled "Method and Apparatus for a Network Connected Storage System".
Office Action dated Apr. 25, 2019 in related European Application No. 15749299.2.
First Office Action dated Sep. 29, 2018 in related Chinese Application No. 2015800195182.

* cited by examiner

DATA STORAGE DEVICE WITH EMBEDDED SOFTWARE

CROSS-REFERENCE TO RELATED APPLICATIONS

This application claims the benefit of U.S. Provisional Application No. 61/940,313, filed on Feb. 14, 2014, which is hereby incorporated by reference in its entirety. This application also claims the benefit of U.S. Provisional Application No. 61/940,269, filed on Feb. 14, 2014, which is hereby incorporated by reference in its entirety.

BACKGROUND

Data Storage Devices (DSDs) are often used to record data onto or to reproduce data from a storage media such as rotating magnetic disks or solid-state memories such as flash. DSDs are conventionally used by a host that processes or transforms data and stores data in the DSD or retrieves data from the DSD. The DSD often accesses data stored in the DSD with a file system that organizes the data into files used by an application running on the host.

The growth of distributed computing, mobile applications, social media applications, and big data applications (i.e., the collection of large amounts of data or complex data) has led to an increase in object based storage which generally allows for better scalability than file based storage. In many cases, the data objects may never be accessed again, but they are expected to remain accessible if needed. Examples of such data objects can include photos, movies, e-commerce data, or archival data stored across a network as in cloud storage. The growth of object based storage has created a need for a storage environment that can accommodate both file based storage and object based storage.

In addition, distributed computing, mobile applications, social media applications, and big data applications have led to the need for larger storage capacities to retain the data used by these applications. The traditional model of a host retrieving data from a DSD, processing the retrieved data, and storing the processed data back in the DSD may not provide the most efficient use of resources in terms of processing efficiency or network traffic when dealing with large amounts of data distributed among different DSDs. In addition, data storage systems will need to provide for more flexibility in handling data, such as allowing for the use of new interfaces and applications being developed in fields such as distributed computing.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Overview

Figure 1:
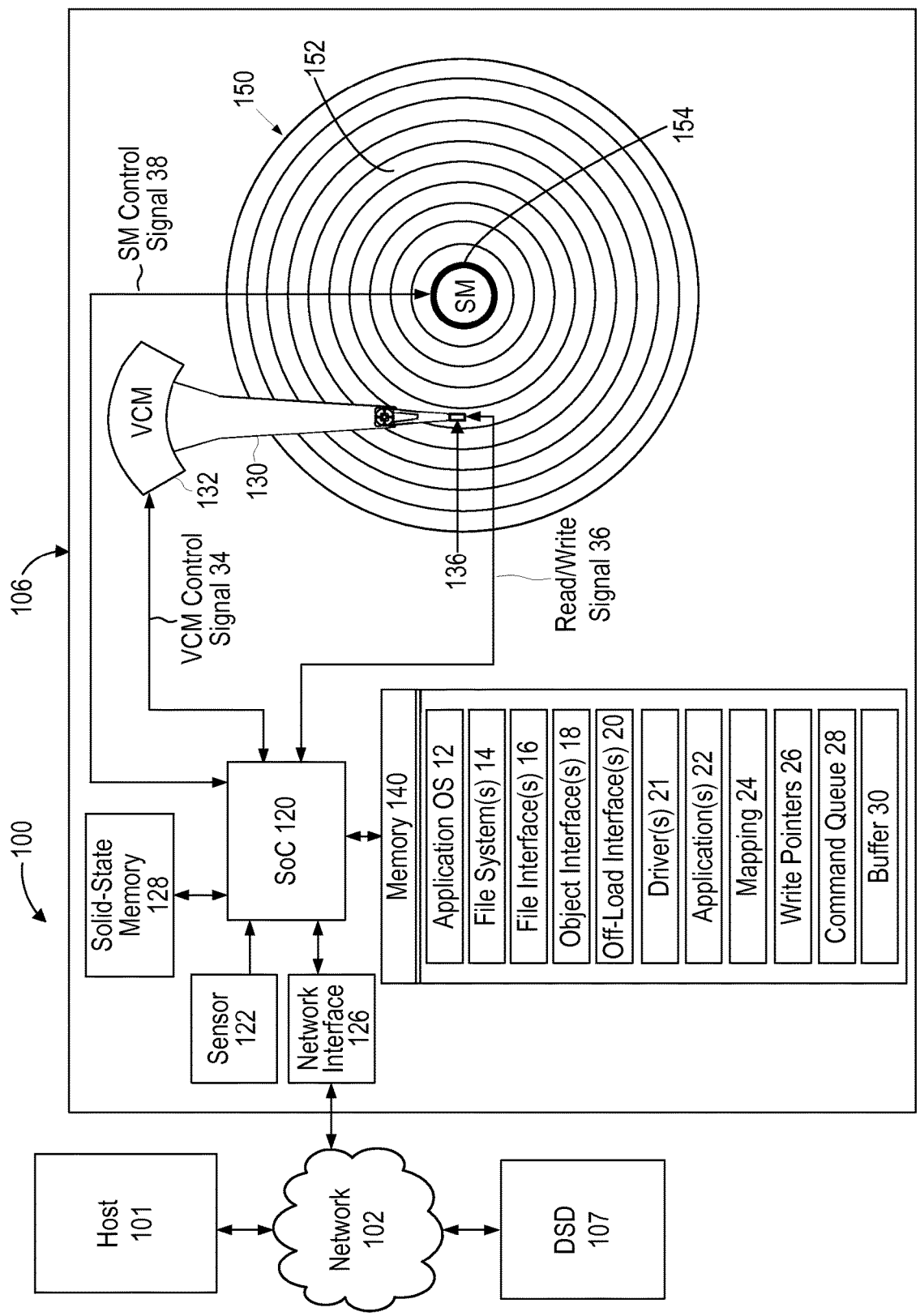
FIG. 1 is a block diagram of a Data Storage Device (DSD) according to an embodiment.

FIG. 1 shows system 100 according to an embodiment which includes host 101 and Data Storage Devices (DSDs) 106 and 107 in communication with each other through network 102. System 100 can be, for example, a data storage center or other computer system that uses multiple DSDs. In addition, system 100 may be a stand-alone system or part of a network, such as network 102, which can, for example, be a local or wide area network, or the Internet. Those of ordinary skill in the art will appreciate that system 100 can include more or less than those elements shown in FIG. 1 and that the disclosed processes can be implemented in other environments. For example, in other embodiments system 100 may only include host 101 and DSD 106 without DSD 107. In such embodiments, system 100 can be, for example, a computer system (e.g., server, desktop, mobile/laptop, tablet, smartphone, etc.) or another electronic device such as a Digital Video Recorder (DVR).

Figure 14:
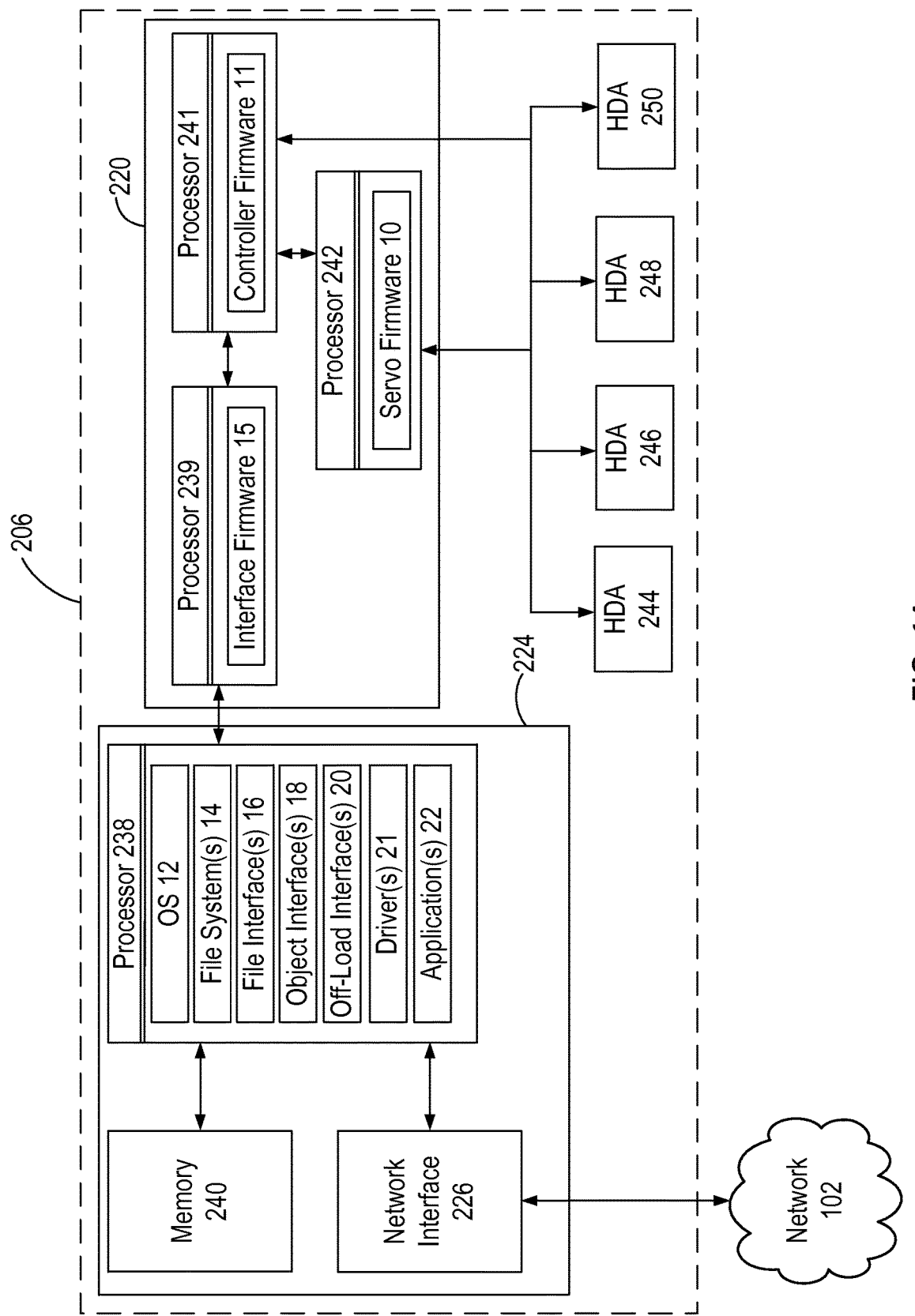
FIG. 14 is a block diagram of a data storage system including a plurality of Hard Disk Assemblies (HDAs) according to an embodiment.

In the example of FIG. 1, DSD 106 includes one or both of solid-state memory 128 and rotating magnetic disk 150 as Non-Volatile Memory (NVM) for storing data. If both are included, DSD 106 can be considered a Solid-State Hybrid Drive (SSHD) in that it includes both solid-state and disk NVM. In other embodiments, DSDs 106 or 107 can include different types of NVM such as, for example, a magnetic tape drive, or the NVM of DSDs 106 or 107 may only disk NVM or solid-state NVM. In yet other embodiments, each of disk 150 or solid-state memory 128 may be replaced by multiple Hard Disk Drives (HDDs) or multiple Solid-State Drives (SSDs), respectively, so that DSD 106 includes pools of HDDs or SSDs. Along these lines, and as an example of a further example environment, the embodiment of FIG. 14 depicts data storage system 206 with multiple Hard Disk Assemblies (HDAs), each including at least one rotating magnetic disk and at least one head for accessing data on a corresponding disk surface.

In the example environment of FIG. 1, DSD 106 includes System on a Chip (SoC) 120 which includes circuitry for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. An example arrangement of SoC 120 is discussed in more detail below with reference to FIG. 2.

Network interface 126 is configured to connect DSD 106 with network 102 using, for example, an Ethernet connection or a WiFi wireless connection. Network interface 126 allows DSD 106 to interface with other devices on network 102 (e.g., host 101 or DSD 107) using a protocol such as TCP/IP. As will be appreciated by those of ordinary skill in the art, network interface 126 can be included as part of SoC 120. In other embodiments, network interface 126 may be replaced with an interface for communicating on a data bus according to a standard such as Serial Advanced Technology Attachment (SATA), PCI express (PCIe), Small Computer System Interface (SCSI), or Serial Attached SCSI (SAS).

As shown in FIG. 1, DSD 106 also includes sensor 122 for obtaining environmental information about an environmental condition of DSD 106. Sensor 122 can include one or more environmental sensors such as, for example, a mechanical shock sensor, a vibration sensor, an accelerometer (e.g., XYZ or YPR accelerometer), a temperature sensor, a humidity sensor, or an air pressure sensor. In addition, one type of sensor can be used to indicate multiple environmental conditions. For example, an accelerometer can be used to indicate both vibration and mechanical shock conditions or an air pressure sensor can be used to indicate changes in altitude and changes in air pressure. In other embodiments, DSD 106 may obtain data from an external sensor such as a camera, a radio frequency sensor, or Radar.

In the example of FIG. 1, disk 150 is rotated by a Spindle Motor (SM) 154. DSD 106 also includes head 136 connected to the distal end of actuator 130 which is rotated by Voice Coil Motor (VCM) 132 to position head 136 in relation to disk 150. SoC 120 can control the position of head 136 and the rotation of disk 150 using VCM control signal 34 and SM control signal 38, respectively.

As appreciated by those of ordinary skill in the art, disk 150 may form part of a disk pack with additional disks radially aligned below disk 150. In addition, head 136 may form part of a head stack assembly including additional heads with each head arranged to read data from and write data to a corresponding surface of a disk in a disk pack.

Disk 150 includes a number of radial spaced, concentric tracks 152 for storing data on a surface of disk 150. Tracks 152 can be grouped together into zones of tracks with each track divided into a number of sectors that are spaced circumferentially along the tracks.

In some implementations, some or all of tracks 152 can be written by a write element of head 136 using Shingled Magnetic Recording (SMR) so as to overlap adjacent tracks. SMR provides a way of increasing the amount of data that can be stored in a given area on disk 150 by overlapping tracks like roof shingles. The non-overlapping portion then serves as a narrow track that can be read by a read element of head 136. In other implementations, all of tracks 152 may be written such that they do not overlap by using Conventional Magnetic Recording (CMR).

Although a higher number of tracks per inch is ordinarily possible with SMR, the overlap in tracks can generally prevent new writes to a previously overlapped track since such new writes would affect data written in the overlapping track. For this reason, tracks are usually sequentially written in SMR implementations to avoid affecting previously written data.

In addition to, or in lieu of disk 150, the NVM media of DSD 106 may also include solid-state memory 128 for storing data. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., Single-Level Cell (SLC) memory, Multi-Level Cell (MLC) memory, or any combination thereof), NOR memory, EEPROM, Ferroelectric Memory (FeRAM), Magnetoresistive RAM (MRAM), other discrete NVM chips, or any combination thereof.

Memory 140 can represent a volatile memory of DSD 106, such as Dynamic Random Access Memory (DRAM), for temporarily storing data used by SoC 120. In other embodiments, memory 140 can be an NVM such as MRAM. In addition, memory 140 can be included as part of SoC 120 in other embodiments. Those of ordinary skill in the art will also appreciate that other embodiments may include less than all of the items depicted as being stored in memory 140.

In operation, a processor of SoC 120 (e.g., processor 138 shown in FIG. 2) accesses information stored in memory 140 during execution of computer-executable instructions in software programs such as application Operating System (OS) 12, file system(s) 14, file interface(s) 16, object interface(s) 18, off-load interface(s) 20, driver(s) 21, or application(s) 22. More specifically, SoC 120 can load computer-executable instructions from an NVM of DSD 106 (e.g., disk 150 or solid-state memory 128) into a region of memory 140 and then execute the stored process instructions from memory 140.

Application OS 12 is an embedded OS of DSD 106 in the sense that application OS 12 is executed on DSD 106 and not executed on a host such as host 101. Application OS 12 manages hardware and software resources of DSD 106 and can include, for example, a Linux OS, Android OS, Windows OS, Mac OS, or a customized OS. Hardware resources managed by application OS 12 can include, for example, network interface 126, solid-state memory 128, disk 150, memory 140, and one or more processors in SoC 120 (e.g., processor 138 shown in FIG. 2). Software resources managed by application OS 12 can include, for example, file system(s) 14, file interface(s) 16, object interface(s) 18, off-load interface(s) 20, driver(s) 21, or application(s) 22.

File system(s) 14 can include one or more file systems for accessing or organizing files stored in NVM of DSD 106. By executing a file system on DSD 106, it is ordinarily possible to tailor the file system to a particular storage media used by DSD 106 to store data. In one example, file system(s) 14 can include a file system that may be well suited to sequentially writing data on SMR media, such as Linear Tape File System (LTFS) or a log-structured file system like New Implementation of a Log-structured File System (NILFS). Other file systems of file system(s) 14 can include, for example, B-tree file system (Btrfs), ext2, ext3, ext4, or XFS. File system(s) 14 can operate in a kernel space of application OS 12, as shown in the example of the kernel space of FIG. 3.

File interface(s) 16 provide one or more file system interfaces for retrieving or storing data as files in NVM of DSD 106 via network 102. Such file interfaces can include, for example, network file systems such as Common Internet File System (CIFS), Network File System (NFS), or Server Message Block (SMB). File interface(s) 16 can operate in a kernel space of application OS 12.

Figure 3:
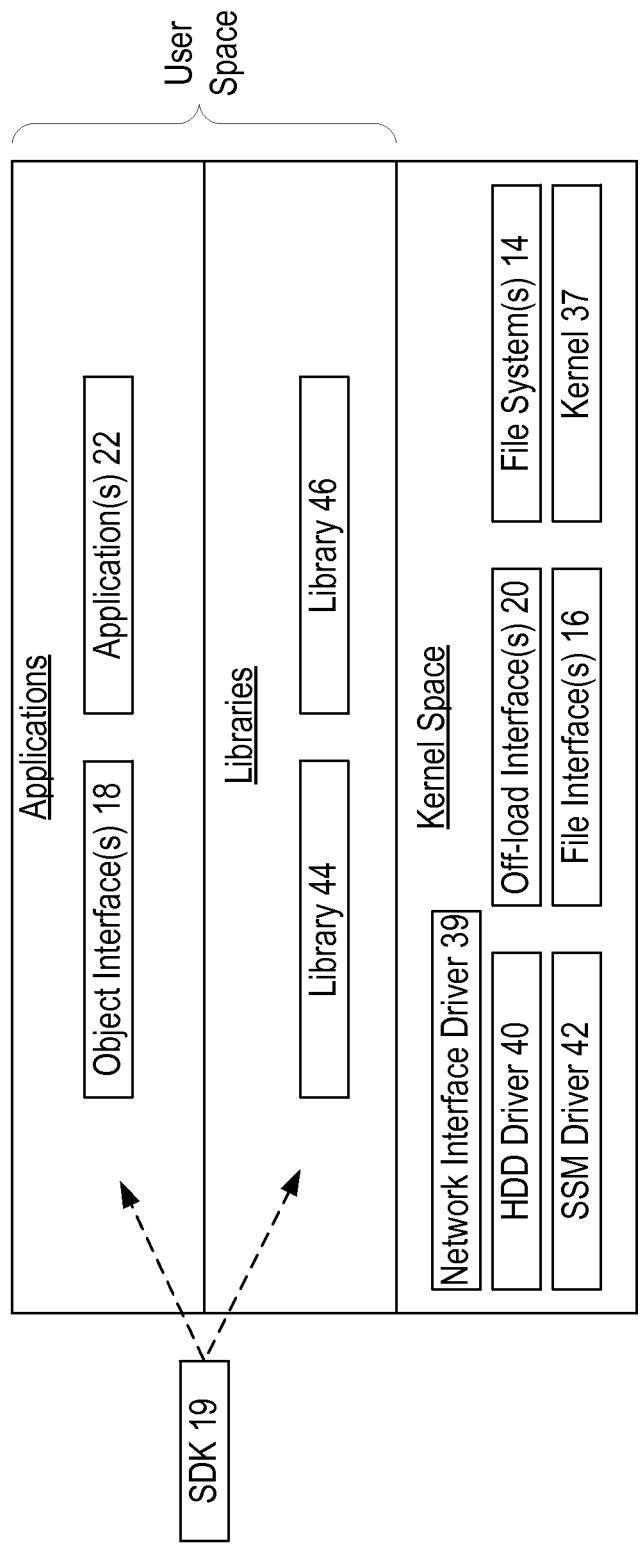
FIG. 3 illustrates a user space and a kernel space according to an embodiment.

Object interface(s) 18 provide an object based storage interface for retrieving or storing data as data objects in NVM of DSD 106 via network 102. Such an object interface can include, for example, Amazon Web Services Simple Storage Service (AWS S3). Object interface(s) 18 can operate in a user space as shown in FIG. 3.

Object based storage at DSD 106 can provide several advantages over file based storage such as a better use of the full capacity of the storage media and more efficient accessing of data by making the DSD more "data aware" of what is being accessed. In one example, object interface(s) 18 can provide additional information about data objects with metadata pertaining to, for example, the ownership of the data object, the creation date of the data object, or the type of data object so that certain data objects or related data can be cached (e.g., stored in memory 140) for quicker access.

Off-load interface(s) 20 provide a way of shifting processing from a host on network 102 (e.g., host 101) to DSD 106. In one implementation, host 101 sends computer-executable instructions to DSD 106 via network interface 126. A processor of SoC 120 (e.g., processor 138) executes the computer-executable instructions to create an off-load interface for accessing or transforming data stored in NVM of DSD 106. Off-load interface(s) 20 can operate in a kernel space of application OS 12 as shown in FIG. 3.

Examples of an off-load interface can include a Ceph or OpenStack software platform or a Hadoop software framework. In some implementations, a processor of SoC 120 may partition its available storage capacity in NVM (e.g., available data capacity in disk 150 and solid-state memory 128) based on areas reserved for different interfaces. For example, a processor of SoC 120 may reserve 20% of its NVM storage capacity to AWS S3 storage, 30% to Ceph functions, and 50% to OpenStack functions. The NVM of DSD 106 could also be dynamically allocated as needed. In one example, 10% of NVM could be reserved for AWS S3 storage, 10% for Ceph functions, 10% for OpenStack functions, and 70% to be allocated among AWS S3, Ceph, and OpenStack as needed. As discussed in more detail below with reference to FIGS. 11 to 13 below, off-load interface(s) 20 can also provide for distributed compute applications that allow DSD 106 to act as a compute node in a cluster of DSDs on network 102.

Driver(s) 21 can include software for interfacing with a firmware of DSD 106 (e.g., controller firmware 11 or servo firmware 10 shown in FIG. 2, or a firmware of network interface 126) and can execute in a kernel space of application OS 12 as shown in FIG. 3. Driver(s) 21 can also allow for interfacing with other devices on network 102 such as DSD 107.

Application(s) 22 can include applications developed by a manufacturer of DSD 106 and/or independently developed applications that have been downloaded from network 102. For example, DSD 106 may receive computer-executable instructions from host 101 via network interface 126 and then execute the computer-executable instructions to create an application 22. In some implementations, a Software Development Kit (SDK) (e.g., SDK 19 shown in FIG. 3) could be made available to allow users on network 102 to develop their own applications to run on DSD 106.

Application(s) 22 or driver(s) 21 can include data storage related applications such as "sniff and store" applications to collect information about data use (e.g., identify file types, attributes, IP addresses and store traffic information), a user interface for operating DSD 106, DSD health monitoring for monitoring a reliability of DSD 106 and/or migrating data to another DSD or NVM within DSD 106 before losing data, data encryption, data compression, erasure coding or error correction, directing data for storage on disk 150 or solid-state memory 128 based on attributes of the data (e.g., tiered storage), deduplication of data stored in DSD 106, or mirroring data (e.g., data backup).

In addition, application(s) 22 or driver(s) 21 can customize DSD 106 for specific uses such as working with sensor data (e.g., where application 22 might include MATLAB or LabVIEW), streaming certain types of media over network 102, configuring DSD 106 to operate as a DVR or media server, managing the synching or backup of compute devices, providing a Bluetooth connection such as for an A/V system, providing a WiFi hotspot, or configuring DSD 106 to operate as a Network-Attached Storage (NAS). Application(s) 22 or driver(s) 21 can also provide for certain network functions on network 102 such as bit coin mining, identification of another DSD on network 102 and identification of data stored on another DSD, migration or copying of data from a failed DSD NVM to another DSD NVM in the network, or the rerouting of data to other DSDs in the network based on environmental conditions such as vibration or temperature detected by sensor 122.

In one implementation, an application 22 can allow a processor of DSD 106 (e.g., processor 138 of SoC 120 shown in FIG. 2) to monitor at least one indicator of a reliability of another DSD on network 102 (e.g., DSD 107) for storing data with the use of network interface 126. An indicator of reliability could include, for example, a number of errors in retrieving or storing data on the other DSD or an amount of use of a particular NVM of the other DSD, such as a number of Program/Erase (P/E) cycles for a flash memory of the other DSD. In some cases, the application 22 may also cause a processor of DSD 106 to copy data from another DSD to an NVM of DSD 106 if one or more indicators of reliability for the other DSD reach an unsafe or undesirable threshold.

In another implementation, an application 22 can cause a processor of DSD 106 to receive an input from sensor 122 indicating an environmental condition of DSD 106 such as a vibration condition, an air pressure condition, a humidity condition, or a temperature condition. The processor can then determine whether the input exceeds an unsafe or undesirable threshold. If the input exceeds the threshold, the processor can redirect at least one command to store data in NVM of DSD 106 to another DSD on network 102 (e.g., DSD 107). The processor may also request environmental condition information from other DSDs on network 102 to identify another DSD to receive one or more redirected commands. In addition, the processor may stop redirecting commands if a subsequent input from sensor 122 indicates that the subsequent input has fallen below a threshold, thereby indicating that it is safe to store data in an NVM of DSD 106.

Data included in mapping 24, write pointers 26, command queue 28, buffer 30, or data to be stored in or retrieved from NVM can also be stored in memory 140 so that the data can be accessed by a processor of DSD 106 (e.g., processor 138 shown in FIG. 2) during execution of software programs to the extent that such software programs have a need to access and/or modify the data. In addition to shifting processing from host 101 to DSD 106 with off-load interface(s) 20, running application OS 12 at DSD 106 can allow for shifting tasks to file system(s) 14, driver(s) 20, and/or application(s) 22 that may otherwise have been performed by firmware (e.g., controller firmware 11 shown in FIG. 2) of DSD 106. In addition to the tasks mentioned above of data encryption, data compression, erasure coding or other error correction, the direction of data for storage on disk 150 or solid-state memory 128, deduplication of data, and data mirroring, a processor of DSD 106 (e.g., processor 138 shown in FIG. 2) executing file system(s) 14, driver(s) 21, or application(s) 22 can use mapping 24, write pointers 26, command queue 28, and buffer 30 to perform other tasks related to the management of storage media in DSD 106. By moving one or more such tasks from a firmware of DSD 106 to a file system 14, application 22, or driver 21 executed on a processor of DSD 106, the tasks can be more easily modified in the field and the firmware of DSD 106 can be simplified.

In one example, mapping 24 can map logical addresses (e.g., Logical Block Addresses (LBAs)) for data to physical addresses (e.g., block addresses) corresponding to locations in NVM of DSD 106 that store the data. This can allow for a processor executing application OS 12 to direct data to a particular NVM (e.g., disk 150 or solid-state memory 128) or particular zones within an NVM based on attributes of the data. Mapping 24 may also be stored in an NVM of DSD 106 such as disk 150 or solid-state memory 128 so that mapping 24 is available after DSD 106 has been powered off. Alternatively, memory 140 may be an NVM such as MRAM.

In some cases, a processor of DSD 106 executing application OS 12 may perform address indirection using mapping 24 to make better use of storage media such as zones of overlapping tracks (i.e., SMR zones) on disk 150 or cells (not shown) in solid-state memory 128. In the case of solid-state memory 128, the processor may use a mapping indirection system to facilitate the rewriting of data associated with a particular logical address at different physical locations on the storage media to provide for wear leveling so that solid-state memory 128 is more evenly used to prolong a usable life of solid-state memory 128.

In the case of SMR tracks on disk 150, a processor executing application OS 12 may use indirection to facilitate the rewriting of data associated with a particular logical address at different physical locations on disk 150 while maintaining a sequential writing. When data is updated for a particular logical address, the update is often written in a different location on disk 150 than where the data for the logical address was previously written to avoid having to rewrite an entire SMR zone of overlapping tracks. Mapping 24 can be used to keep track of where the current versions of the data are stored for a particular logical address.

Write pointers 26 can be used by a processor executing application OS 12 to keep track of a location for performing a next write in a sequentially written zone such as an SMR zone on disk 150. Write pointers 26 may also be stored in an NVM of DSD 106 such as disk 150 or solid-state memory 128 so that write pointers 26 are available after DSD 106 has been powered off.

In another example, a processor executing application OS 12 may reorder the performance of pending write commands in command queue 28 so that the data to be written in performing the pending write commands follows an increasing or decreasing order of logical addresses to be written. In one example, the processor may group the order of performance of commands by host so that all of the commands from a particular host are performed in a sequential manner. Such an ordering of commands can allow for an improved overall performance in processing the commands. In addition, the processor can manage command queue 28 and mapping 24 so that all of the write commands from a particular host are written in a localized area of NVM such as in a particular zone of tracks on disk 150. The processor may also reorder the performance of pending read and write commands for disk 150 as part of a Rotational Position Optimization (RPO) algorithm to reduce the amount of movement needed in positioning head 136 over disk 150 in performing the commands.

Buffer 30 may be used by a processor executing application OS 12 in performing Read-Modify-Write (RMW) operations on disk 150, such as garbage collection to reclaim portions of disk 150 storing invalid or obsolete data. In such an operation, the processor may read a zone of tracks and store the valid data from the zone in buffer 30 before rewriting the valid data on disk 150. In addition, the processor may identify or prioritize a particular zone for garbage collection by determining a level of invalid or obsolete data stored in the zone and/or a frequency of use of the zone.

Embedded Application OS Example Environments

Figure 2:
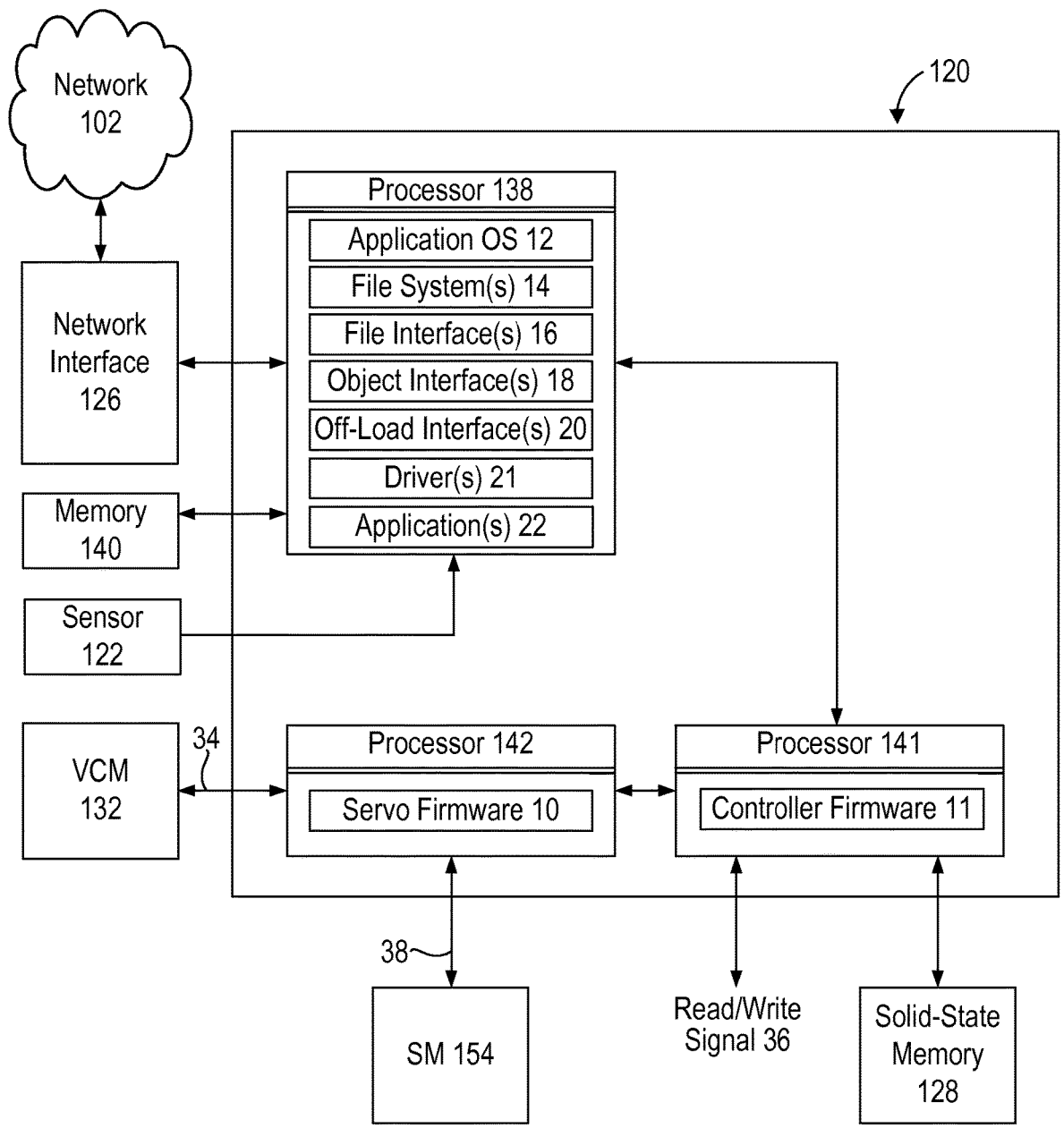
FIG. 2 is a block diagram of a System on a Chip (SoC) of the DSD of FIG. 1 according to an embodiment.

FIG. 2 is a block diagram depicting SoC 120 of DSD 106 according to an embodiment. In FIG. 2, SoC 120 includes processors 138, 141, and 142. In other embodiments, one or more of processors 138, 141, and 142 may be located on different chips such that not all of processors 138, 141, and 142 are located in SoC 120. In addition, processors 141 and 142 may be combined into one processor or processors 141 and 142 may serve as co-processors of processor 138 in other embodiments.

In one implementation, each of processors 138, 141, and 142 is a processor core such as an ARM M3 processor. In another implementation, processor 138 can include an ARM A5 or A6 processor while processors 141 and 142 can be ARM M3 processors. In yet other implementations, different types of processors can be used such as Intel processors.

As shown in FIG. 2, processor 138 executes application OS 12, file system(s) 14, file interface(s) 16, object interface(s) 18, off-load interface(s) 20, driver(s) 21, and application(s) 22. Processor 138 interfaces with memory 140 in executing such software and interfaces with network interface 126 in communicating via network 102.

As discussed above, having application OS 12 embedded or running on DSD 106 can provide several advantages over conventional DSDs that do not locally execute an embedded application OS. Such advantages include the ability to support TCP/IP over Ethernet or WiFi interfaces (e.g., via network interface 126), the ability to embed a file system (e.g., file system(s) 14) that is better adapted to a particular storage media of DSD 106, and to allow for new applications (e.g., application(s) 22) to be developed for different uses of DSD 106. As will be appreciated by those of ordinary skill in the art, one or both of processors 141 and 142 may run a Real-Time Operating System (RTOS) that is intended to perform real-time processes for servo firmware 10 or controller firmware 11. In contrast, processor 138 runs application OS 12 which allows for the execution of file system(s) 14, file interface(s) 16, object interface(s) 18, off-load interface(s) 20, driver(s) 21, and/or application(s) 22 as discussed in more detail below.

In storing or retrieving data from NVM of DSD 106, processor 138 executes application OS 12 to interface with processor 141, which executes controller firmware 11. Controller firmware 11 controls operation of the NVM of DSD 106, and may be stored in a dedicated memory of SoC 120 (e.g., a flash memory not shown) or may be stored on other NVM of DSD 106 such as disk 150 or solid-state memory 128.

As noted above, the use of an application OS at processor 138 can allow for a simplified firmware of DSD 106. In more detail, many of the tasks conventionally performed by executing DSD firmware may be shifted to software executed by processor 138. As a result, controller firmware 11 in some implementations may primarily serve only to store or retrieve data in NVM with many of the maintenance operations for the NVM being performed by file system(s) 14, driver(s) 21, and/or application(s) 22. Tasks that may be shifted to processor 138 can include, for example, data encryption, data compression, erasure coding or other error correction, data deduplication, data mirroring, the direction of data for storage on disk 150 or solid-state memory 128 based on attributes of the data, the direction of data for storage in a CMR zone (i.e., a zone of non-overlapping tracks) or an SMR zone (i.e., a zone of overlapping tracks) of disk 150 based on attributes of the data, address mapping with mapping 24, maintenance of write pointers 26, ordering of command queue 28, or garbage collection using buffer 30.

In operation, processor 138 can execute application OS 12 to interface with processor 141 and send a command to processor 141 to retrieve data from or store data in disk 150 or solid-state memory 128. The interface between processor 138 and processor 141 can be object based, use a standard such as SAS or SATA, or be a custom interface. In the case of an object based interface, processor 138 can use application OS 12 to execute object interface 18 to send a command to retrieve, store, or delete particular data objects stored in disk 150 or solid-state memory 128. In the case of using a standard such as SAS or SATA, processor 138 can use a file system 14, a file interface 16, or a driver 21 to send read, write, or trim commands for particular LBAs associated with the data. In the case of a custom interface, a manufacturer may provide a customized file system 14 or a driver 21 to send commands to processor 141.

If access to disk 150 is needed, processor 141 communicates with processor 142, which executes servo firmware 10. In this regard, processor 142 controls SM 154 via SM control signal 38 to rotate disk 150. Processor 142 also controls VCM 132 via VCM control signal 34 to position head 136 over disk 150.

FIG. 3 depicts a user space and a kernel space of DSD 106 according to an embodiment. Application OS 12 can segregate the memory used for the applications and libraries shown in the user space from the memory used for the drivers, kernel, and file system shown in the kernel space to provide for better fault tolerance and security of the software executed by processor 138. As noted above, application OS 12 can include various types of OS such as a Linux OS, Android OS, Windows OS, Mac OS, or a customized embedded OS. Accordingly, the example OS environment of FIG. 3 can vary in other embodiments and can include different components than those shown in FIG. 3.

As shown in FIG. 3, object interface(s) 18 and application(s) 22 can run in a user space, and can access libraries 44 and 46 in the user space to make system calls to a kernel of application OS 12 (e.g., kernel 37). Libraries 44 and 46 can include, for example, specific OS libraries such as Android's SQLite, or protocols such as Google Buffer Protocols, or AWS protocol.

Hardware drivers such as network interface driver 39, HDD driver 40, and Solid-State Memory (SSM) driver 42 can operate in the kernel space. Off-load interface(s) 20, file interface(s) 16, and file system(s) 14 can also operate in the kernel space. In other implementations, a driver 21 or file system 14 may be treated like application(s) 22 and run in user space instead of kernel space (e.g., a customized DSD driver or a File System in User Space (FUSE)).

FIG. 3 also depicts SDK 19 which can be used outside of DSD 106 to create new applications 22 for DSD 106. In one implementation, SDK 19 can include an Application Programming Interface (API) to allow access to an application framework and certain libraries of the user space so that a developer can create a new application 22 to operate on processor 138.

Figure 4:
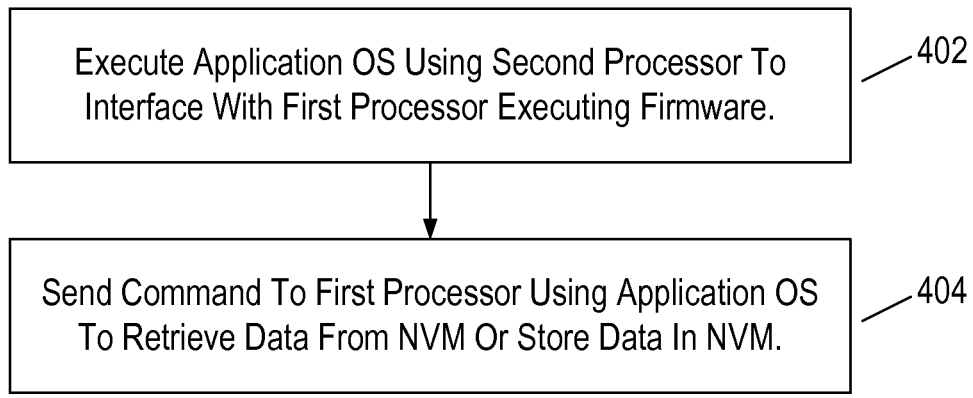
FIG. 4 is a flowchart for a processor interface process according to an embodiment.

FIG. 4 is a flowchart for a processor interface process that can be performed by processor 138 executing application OS 12 according to an embodiment. In block 402, processor 138 executes application OS 12 to interface with processor 141 executing firmware 11.

In block 404, processor 138 uses application OS 12 to send a command to processor 141 to retrieve data from NVM (e.g., disk 150 or solid-state memory 128) or to store data in NVM. As discussed above, the command to processor 141 can be object based in specifying device block addresses, or the command to processor 241 can specify LBAs for the data with a standard such as SAS or SATA. In this regard, application OS 12 may execute a file interface 16, an object interface 18, or a driver 21 such as HDD driver 40 or SSM driver 42 to retrieve or store data in the NVM.

Figure 5:
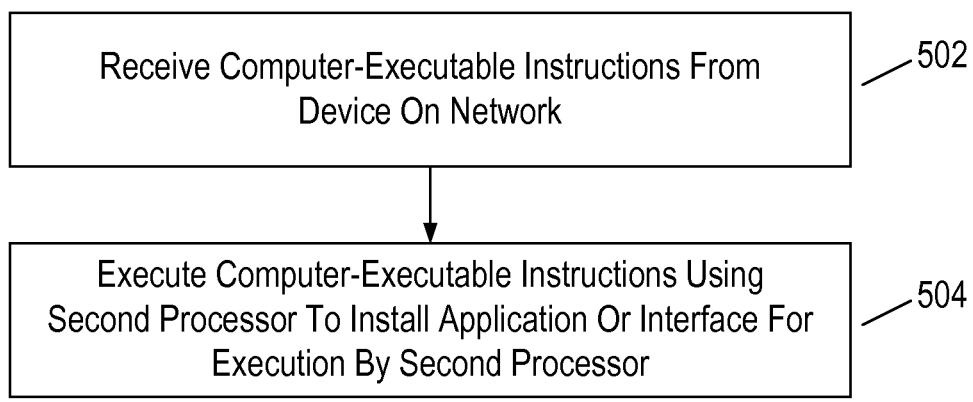
FIG. 5 is a flowchart for an application or interface installation process according to an embodiment.

FIG. 5 is a flowchart for an application or interface installation process that can be performed by processor 138 according to an embodiment. In block 502, processor 138 receives computer-executable instructions via network interface 126 from a device on network 102 such as host 101.

In block 504, processor 138 executes the computer-executable instructions received in block 502 to install an application 22 or install an interface such as an object interface 18 or off-load interface 20. As discussed above, application(s) 22 can include applications developed by a manufacturer of DSD 106 and/or applications developed by others. In some implementations, an SDK (e.g., SDK 19 shown in FIG. 3) could be made available to allow users on network 102 to develop their own applications 22 to run on DSD 106 with access to certain libraries such as library 44 or 46.

Multiple Interface Examples

Figure 6:
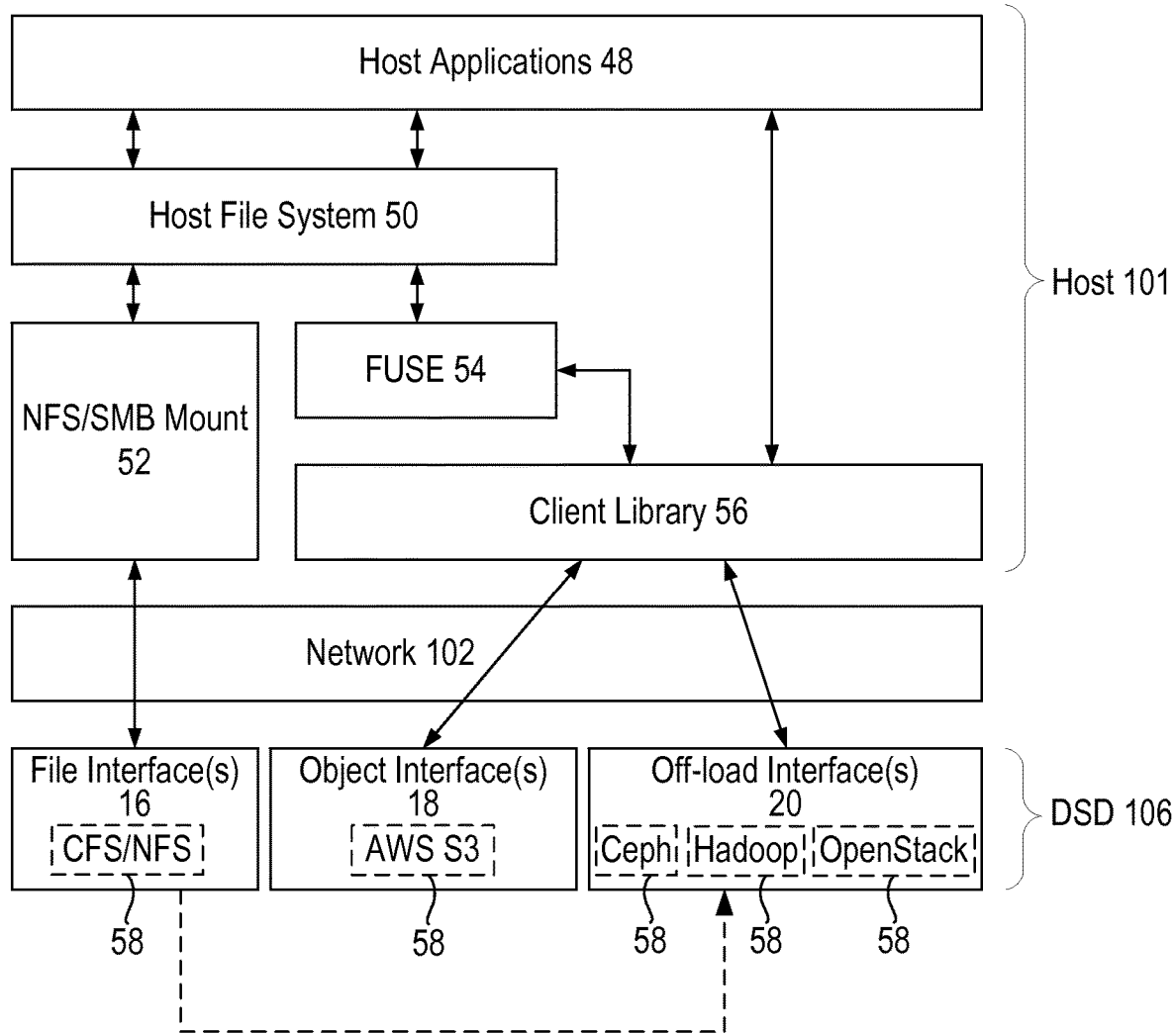
FIG. 6 is a diagram depicting interactions between a host and multiple interfaces of a DSD according to an embodiment.

FIG. 6 is a diagram depicting interactions between host 101 and different software interfaces executed by processor 138 according to an embodiment. As shown in FIG. 6, host 101 can communicate with file interface(s) 16, object interface(s) 18, or off-load interface(s) 20 of DSD 106 via network 102. In other embodiments, host 101 may only communicate with one type of interface of DSD 106 while another host on network 102 may communicate with a different type of interface of DSD 106. This can ordinarily allow for greater flexibility in the types of devices on network 102 or the software that can be executed by devices on network 102.

In the example shown in FIG. 6, host applications 48 can interface with DSD 106 via host file system 50 and NFS/SMB mount 52 or through client library 56 with or without FUSE 54. When host 101 interfaces through NFS/SMB mount 52, a file interface 16 such as CIFS/SMB mounts to host file system 50, which can send commands from processor 138 to processor 141 of DSD 106 to retrieve data or store data in NVM such as disk 150 or solid-state memory 128.

When host 101 interfaces with DSD 106 through client library 56, an object interface 18 such as AWS S3 or an off-load interface 20 such as Ceph, Hadoop, or OpenStack executing in processor 138 can perform object commands such as Create, Read, Update, and Delete (CRUD) commands on objects stored in NVM of DSD 106. In this regard, the object interface 18 or the off-load interface 20 may send a read or write command to processor 141 to access the data stored in NVM.

Each of the example interfaces executed at DSD 106 (i.e., CFS/NFS, AWS S3, Ceph, Hadoop, OpenStack) is implemented by application OS 12 within a software container 58 such as a docker in a Linux OS to provide an additional layer of abstraction and resource isolation. This can be accomplished, for example, with different namespaces that allow for different software containers to operate in a single instance while generally avoiding the overhead associated with running a Virtual Machine (VM).

FIG. 6 also depicts an example interaction between a file interface 16 and an off-load interface 20 with an arrow from file interface(s) 16 to off-load interface(s) 20. In such an example, data received from NFS/SMB mount 52 may include an executable image as part of a certain directory known to a file interface 16 to include data to be handled by an off-load interface 20. If so, the file interface 16 can pass the executable image to the off-load interface 20 for further handling or processing.

Figure 7A:
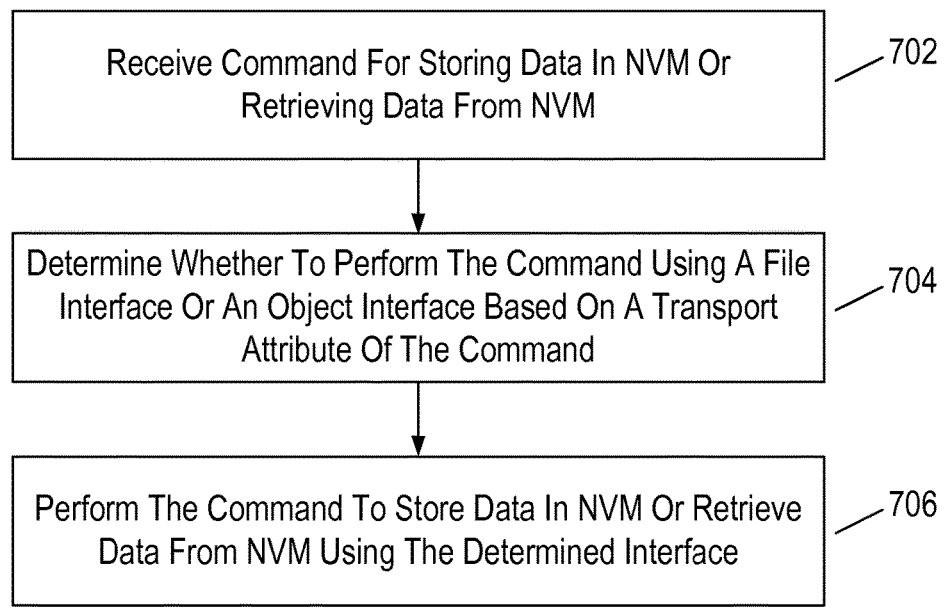
FIG. 7A is a flowchart for performing a command for storing data in a Non-Volatile Memory (NVM) or retrieving data from an NVM using a file interface or an object interface according to an embodiment.

FIG. 7 is a flowchart for performing a command for storing data in NVM (e.g., disk 150 or solid-state memory 128) of DSD 106 or retrieving data from NVM of DSD 106 using a file interface or an object interface according to an embodiment. The process of FIG. 7 can be performed by processor 138 using application OS 12 to determine whether to execute a file interface 16 or an object interface 18 based on a command received via network interface 126.

In block 702, processor 138 receives a command for storing data in NVM or retrieving data from NVM. The data is received by processor 138 from network 102 via network interface 126 and may come from a host or client (e.g., host 101) on network 102 or from another DSD (e.g., DSD 107) on network 102.

Figure 7B:
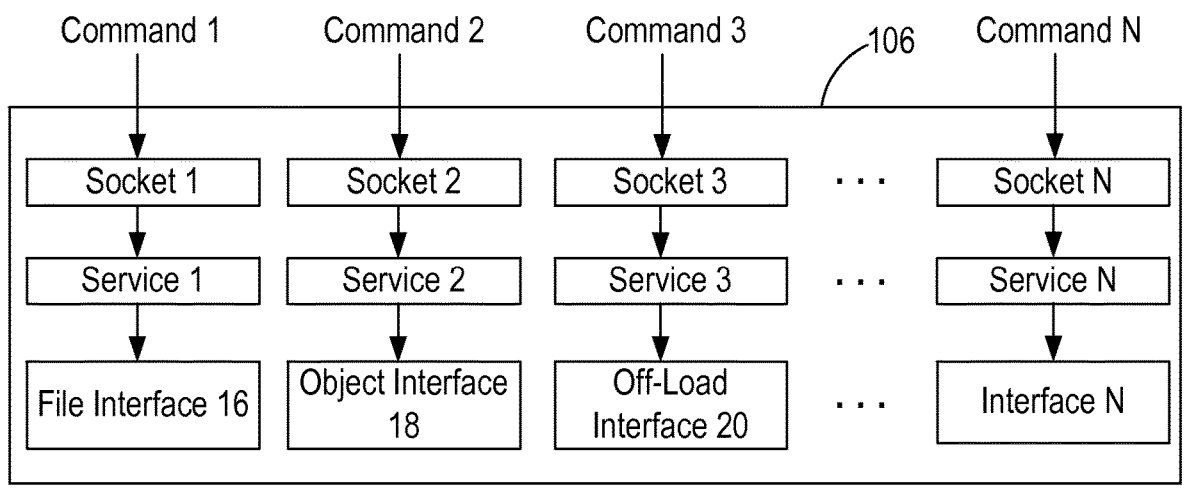
FIG. 7B is a diagram depicting the receipt of commands with different transport attributes according to an embodiment.

In block 704, processor 138 determines whether to execute a file interface 16 or an object interface 18 based on a transport attribute of the command received in block 702. FIG. 7B provides an example of the receipt of commands with different transport attributes. In the example of FIG. 7B, DSD 106 receives multiple commands (i.e., commands 1 to N) from network 102. Each of the commands are directed to an appropriate interface such as a file interface 16, an object interface 18, or an off-load interface 20 based on a socket (i.e., sockets 1 to N) that receives the command. In one implementation, an interface (e.g., file interface 16, object interface 18, or off-load interface 20) may create a socket and a service (e.g. services 1, 2, or 3) of application OS 12 routes an incoming command to the appropriate interface based on a socket address included with the command that may specify a protocol, local address, local port, remote address, and remote port. In such an implementation, the socket address of the command can serve as a transport attribute that can be used by application OS 12 to determine whether to use a file interface 16, an object interface 18, or an off-load interface 20.

Returning to FIG. 7A, processor 138 in block 706 performs the received command using the interface determined in block 704. In the case where a file interface 16 is used, processor 138 can interface with processor 141 using a standard such as SATA or SAS. In the case where an object interface 18 is used, processor 138 can either provide processor 141 with LBAs for the data object or can provide device block addresses for the data object without specifying LBAs. Processor 138 may also use a custom interface with either of file interface 16 or object interface 18.

Figure 8A:
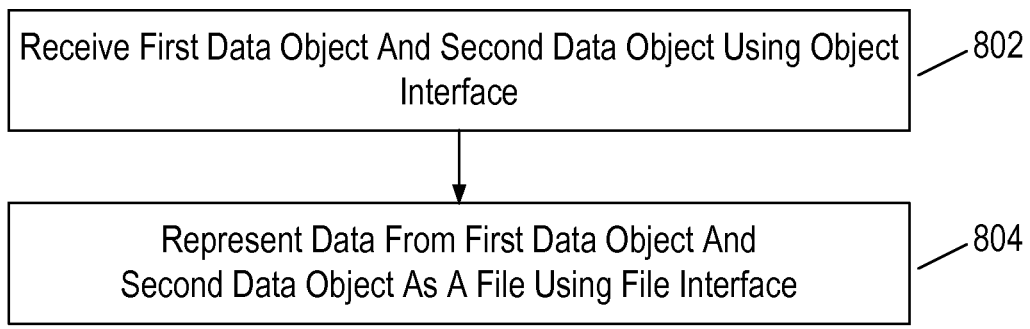
FIG. 8A is a flowchart for a file representation process according to an embodiment.

FIG. 8A is a flowchart for a file representation process that can be performed by processor 138 according to an embodiment. In block 802, processor 138 receives a first data object and a data second object via network interface 126. An object interface 18 can be used by processor 138 to store the first data object and the second data object in NVM of DSD 106 as described above for block 706 of FIG. 7.

In block 804, processor 138 executes a file interface 16 to represent data from the first and second data objects as a file. In one example, the file may be represented to a device on network 102 based on a request received from the device to retrieve data stored in NVM of DSD 106. In this regard, different devices on network 102 may interface with DSD 106 using different interfaces of DSD 106. For example, one host on network 102 executing a particular file system may retrieve and store data on DSD 106 by specifying LBAs associated with the data in the host's file system while another host on network 102 may retrieve and store data on DSD 106 by specifying Object IDs (OIDs) that are uniquely associated with particular data objects stored in network 102. By using both file interface 16 and object interface 18, it is ordinarily possible for DSD 106 to perform commands received from a device using a file system and from a device using object based storage. This arrangement can allow for more flexibility in the devices and software used on network 102 and the distributed functions that can be performed on network 102.

Figure 8B:
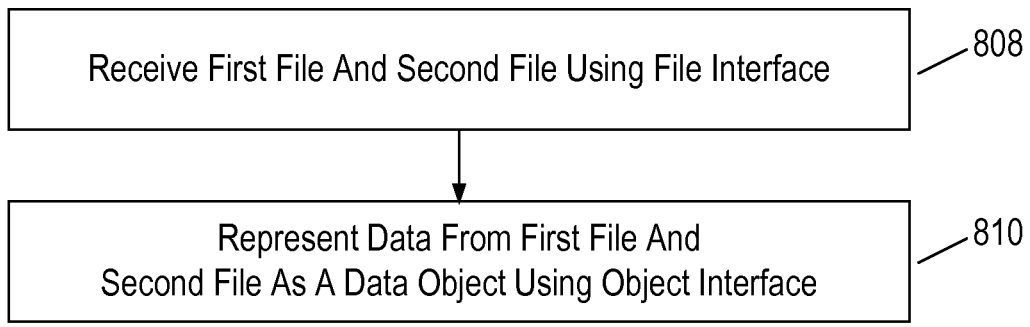
FIG. 8B is a flowchart for a data object representation process according to an embodiment.

FIG. 8B is a flowchart for a data object creation process that can be performed by processor 138 according to an embodiment. In block 808, processor 138 receives a first file and a second file via network interface 126. A file interface 16 can be used by processor 138 to store the first file and the second file in NVM of DSD 106 as described above for block 706 of FIG. 7.

In block 810, processor 138 executes an object interface 18 to represent data from the first file and the second file as a data object. In one example, the data object may be represented based on a request received from a device such as host 101 to retrieve data stored in NVM of DSD 106. As noted above with respect to FIG. 8A, different devices on network 102 may interface with DSD 106 using different interfaces of DSD 106.

Off-Load Interface Examples

As described in more detail with reference to FIGS. 9 to 13 below, the use of an off-load interface executed on DSD 106 can allow for processing at DSD 106 that might otherwise be performed by host 101 or by other hosts/clients in network 102. By off-loading or shifting processing closer to where data is stored, it is ordinarily possible to process data more efficiently and reduce network traffic since the data to be processed does not need to be retrieved by a host or client. In addition, data that is locally processed by a DSD in some cases may not need to be sent back to the host or client, which further improves overall processing efficiency and network traffic. These improvements are particularly apparent where large amounts of data need to be processed.

Figure 9:
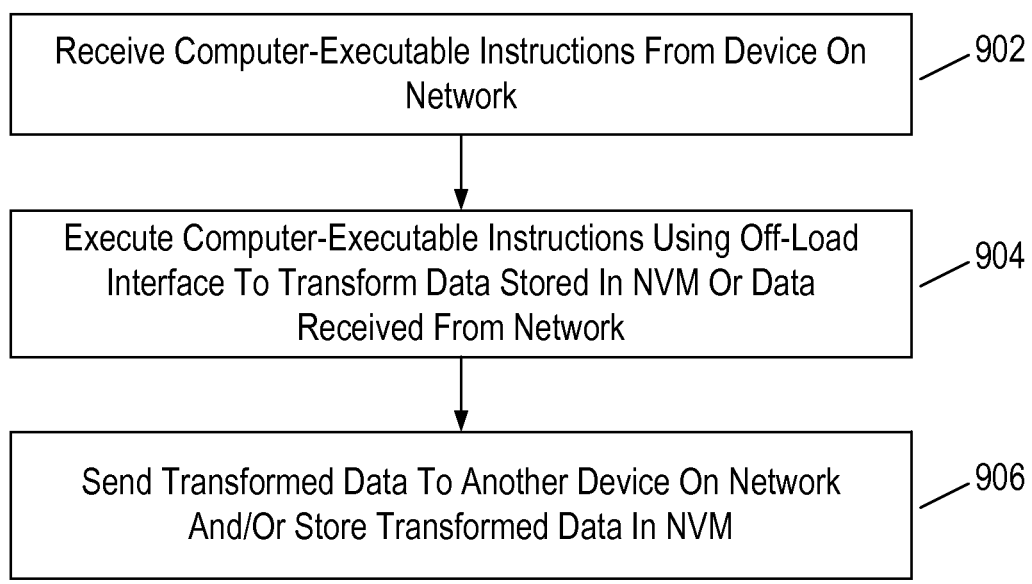
FIG. 9 is a flowchart for an off-load interface process to transform data according to an embodiment.

FIG. 9 is a flowchart for an off-load interface process that can be performed by processor 138 according to an embodiment. In block 902, processor 138 receives computer-executable instructions from a device on network 102 (e.g., host 101) via network interface 126. The computer-executable instructions can include, for example, an executable image, protocol rules, or other executable instructions set by host 101.

In block 904, processor 138 executes the computer-executable instructions using an off-load interface 20 to transform data stored in NVM of DSD 106 or data received from network 102 via network interface 126. Examples of the off-load interface 20 can include, for example, a Ceph software platform, a Hadoop software framework, or an OpenStack software platform. The computer-executable instructions received in block 902 can then correspond to the particular off-load interface used by processor 138.

In block 906, processor 138 using the off-load interface 20 sends the transformed data to another device on network 102 and/or stores the transformed data in NVM of DSD 106. As discussed in more detail below with reference to FIGS. 11 to 13, in some implementations, the transformed data can be sent to another DSD in a cluster of DSDs for further processing or transformation of the transformed data.

Figure 10A:
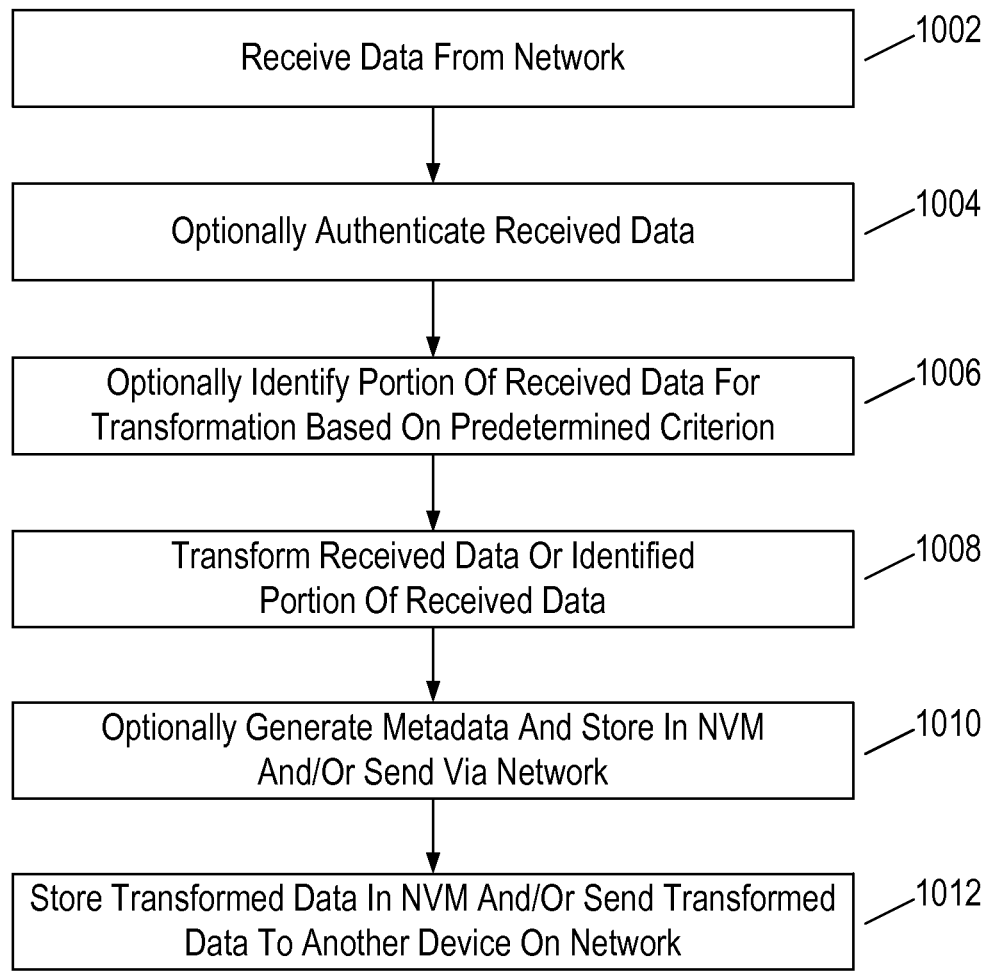
FIG. 10A is a flowchart for transforming data received from a network using an off-load interface according to an embodiment.

FIG. 10A is a flowchart for transforming data received from network 102 using an off-load interface 20 executed by processor 138 according to an embodiment. In block 1002, data is received from network 102 via network interface 126. The data can be received from a device on network 102 such as host 101 or DSD 107.

In block 1004, processor 138 optionally authenticates the data received in block 1002 to verify that the data came from a device on network 102. In one implementation, an off-load interface 20 or an application 22 can be used to apply a public key to verify a digital signature encrypted by a device on network 102 that sent the data using the device's private key. Other methods of authentication may be used in other implementations. In other embodiments, block 1004 can be omitted.

In block 1006, processor 138 using the off-load interface 20 optionally identifies a portion of the data received in block 1002 for transformation based on a predetermined criterion. The predetermined criterion can result from execution of computer-executable instructions received from host 101 via network interface 126. For example, processor 138 may receive data corresponding to a set of digital photographs. The computer-executable instructions received from host 101 can configure processor 138 to identify portions of the data corresponding color photographs that are to be transformed into black and white photographs. This may be based on attributes of the data, or in the case of data objects, metadata sent with the data objects indicating that a particular data object corresponds to a color photograph.

In block 1008, processor 138 executes computer-executable instructions received from host 101 via network interface 126 to transform the data received in block 1002. In one implementation, the computer-executable instructions may cause processor 138 to transform the received data by combining the received data with data stored in NVM of DSD 106. For example, the computer-executable instructions can cause processor 138 to add a zip code from a data structure stored in NVM when the received data includes an address that is missing a zip code.

In block 1010, processor 138 optionally generates metadata concerning the transformed data. In one example, the metadata may provide statistical information about the transformed data such as a count of a certain type of data received by DSD 106. The metadata can be stored in NVM of DSD 106 and/or sent to a device on network 102 via network interface 126. In other embodiments, block 1010 can be omitted.

In block 1012, processor 138 executing the off-load interface 20 stores the transformed data in NVM of DSD 106 and/or sends the transformed data to another device on network 102 via network interface 126. As discussed below with reference to FIGS. 11 to 13 the transformed data can be sent to another device on network 102 for further processing or storage of the transformed data.

Figure 10B:
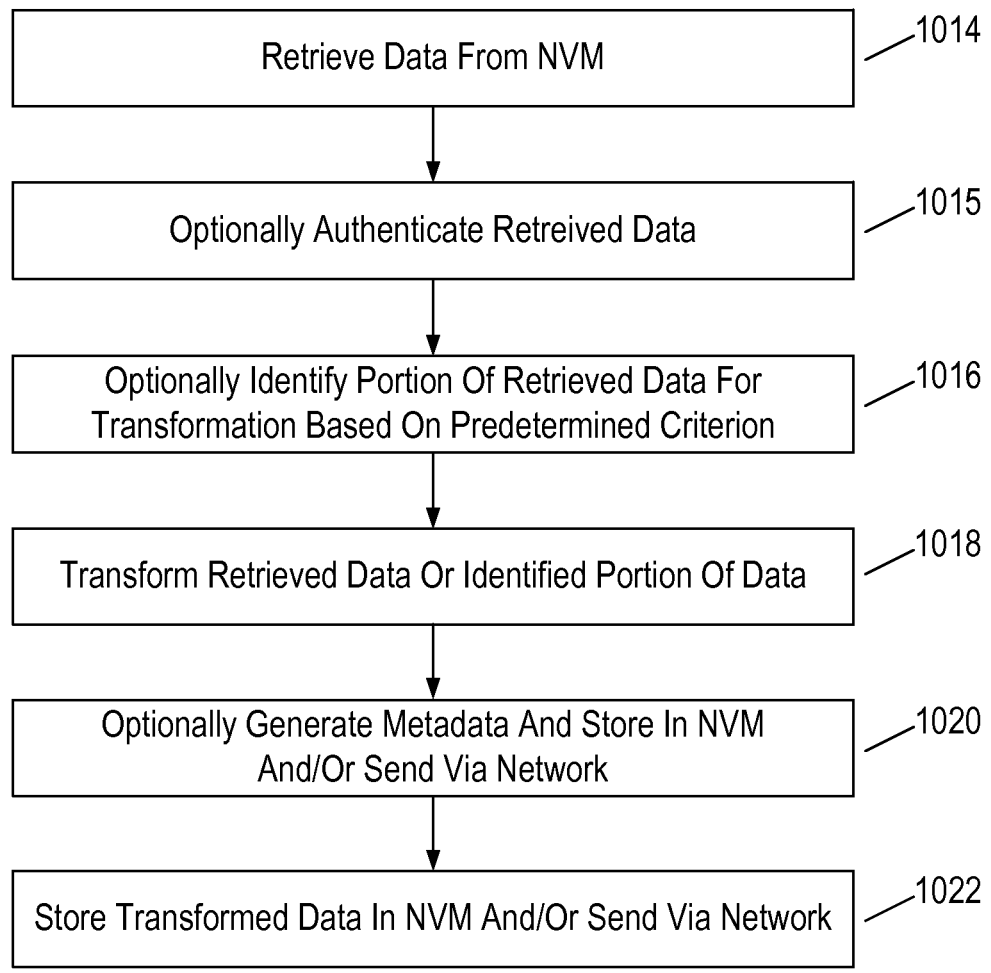
FIG. 10B is a flowchart for transforming data retrieved from an NVM using an off-load interface according to an embodiment.

FIG. 10B is a flowchart that can be performed by processor 138 for transforming data read from NVM of DSD 106 using an off-load interface according to an embodiment. In block 1014, processor 138 retrieves data from NVM of DSD 106 using an off-load interface 20. The retrieval of data can be, for example, in response to a command received from a device on network 102 or as a function triggered by computer-executable instructions received from host 101.

In block 1015, processor 138 optionally authenticates the data retrieved in block 1014 to verify that the data is the correct data or that the data has not been altered. In one implementation, an off-load interface 20 or an application 22 can be used to authenticate the retrieved data with a cryptographic hash function. Other methods of authentication may be used in other implementations. In other embodiments, block 1015 can be omitted.

In block 1016, processor 138 using the off-load interface 20 optionally identifies a portion of the data retrieved in block 1014 for transformation based on a predetermined criterion. In some implementations, the predetermined criterion can result from execution of computer-executable instructions received from host 101 via network interface 102. In other embodiments, block 1016 can be omitted.

In block 1018, processor 138 using the off-load interface 20 transforms the data retrieved from NVM in block 1014. In block 1020, processor 138 optionally generates metadata concerning the transformed data and sends the metadata to a device on network 102 and/or stores the metadata in NVM of DSD 106. In one example, the generated metadata provides statistical information concerning the transformed data. In other embodiments, block 1018 can be omitted.

In block 1022, processor 138 executing the off-load interface 20 stores the transformed data in NVM of DSD 106 and/or sends the transformed data to another device on network 102 via network interface 126. As discussed below with reference to FIGS. 11 to 13 the transformed data can be sent to another device on network 102 for further processing or storage of the transformed data.

Figure 11:
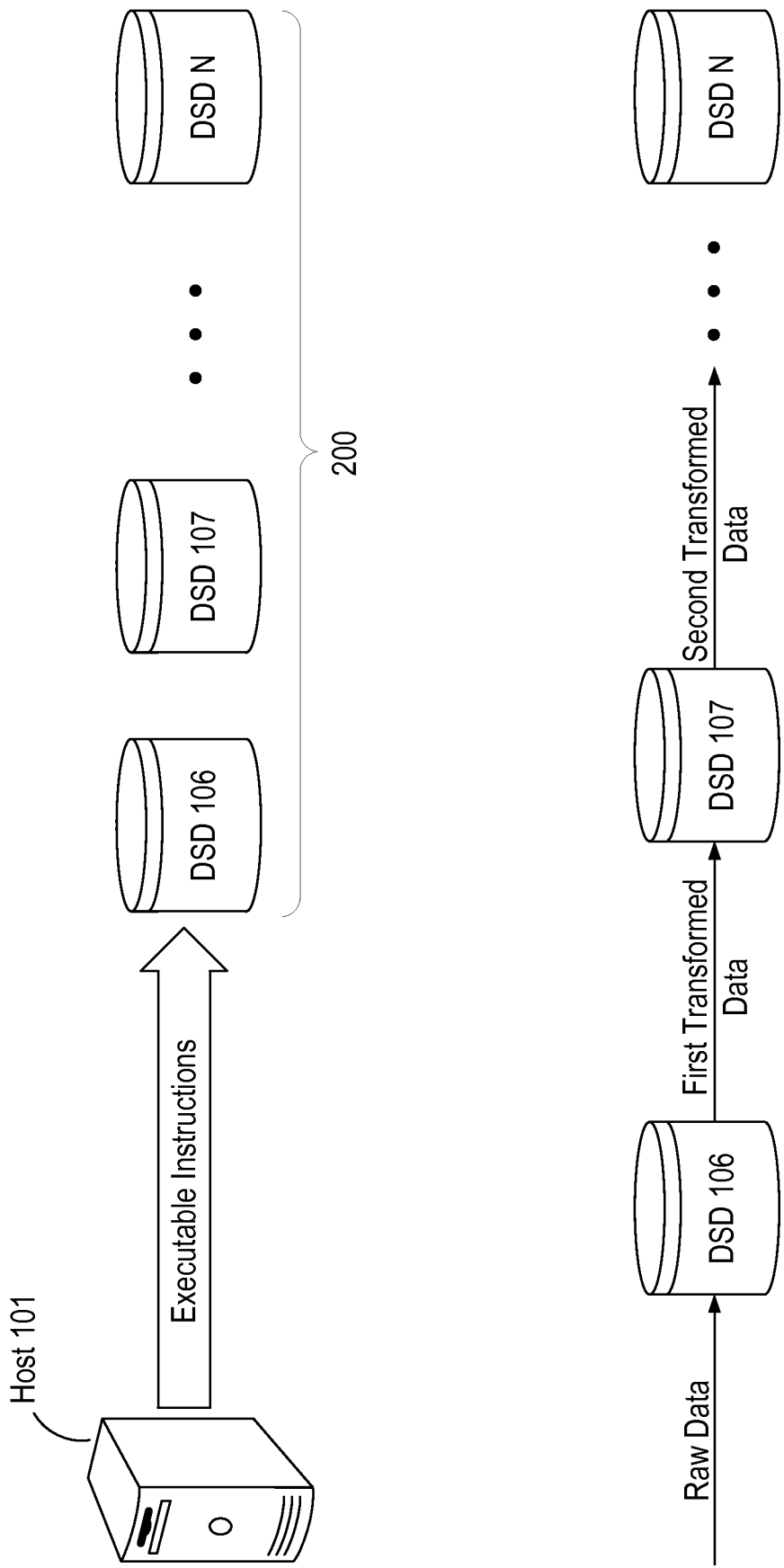
FIG. 11 is a diagram depicting a cluster of DSDs used to transform data in series according to an embodiment.

FIG. 11 is a diagram depicting cluster 200 of DSDs used to transform data in series according to an embodiment. As shown in FIG. 11, host 101 provides cluster 200 with executable instructions for processing data. The executable instructions can include, for example, an executable image, protocol rules, or other executable instructions set by host 101 that can be used by an off-load interface 20 at each of the DSDs in cluster 200.

Raw data is fed to DSD 106 from a device on network 102 (e.g., a host/client or DSD) where DSD 106 executes the executable instructions received from host 101 to transform the raw data into first transformed data. The transformation of the raw data can follow a process such as the process described above for FIG. 10A.

The first transformed data is sent to DSD 106, which further transforms the first transformed data into second transformed data before sending the second transformed data to another DSD in cluster 200. This process may continue for a set number of transformations or until a particular result is obtained. In other embodiments, the second transformed data can be stored at DSD 107 without sending the second transformed data on to a next DSD in cluster 200.

Figure 12:
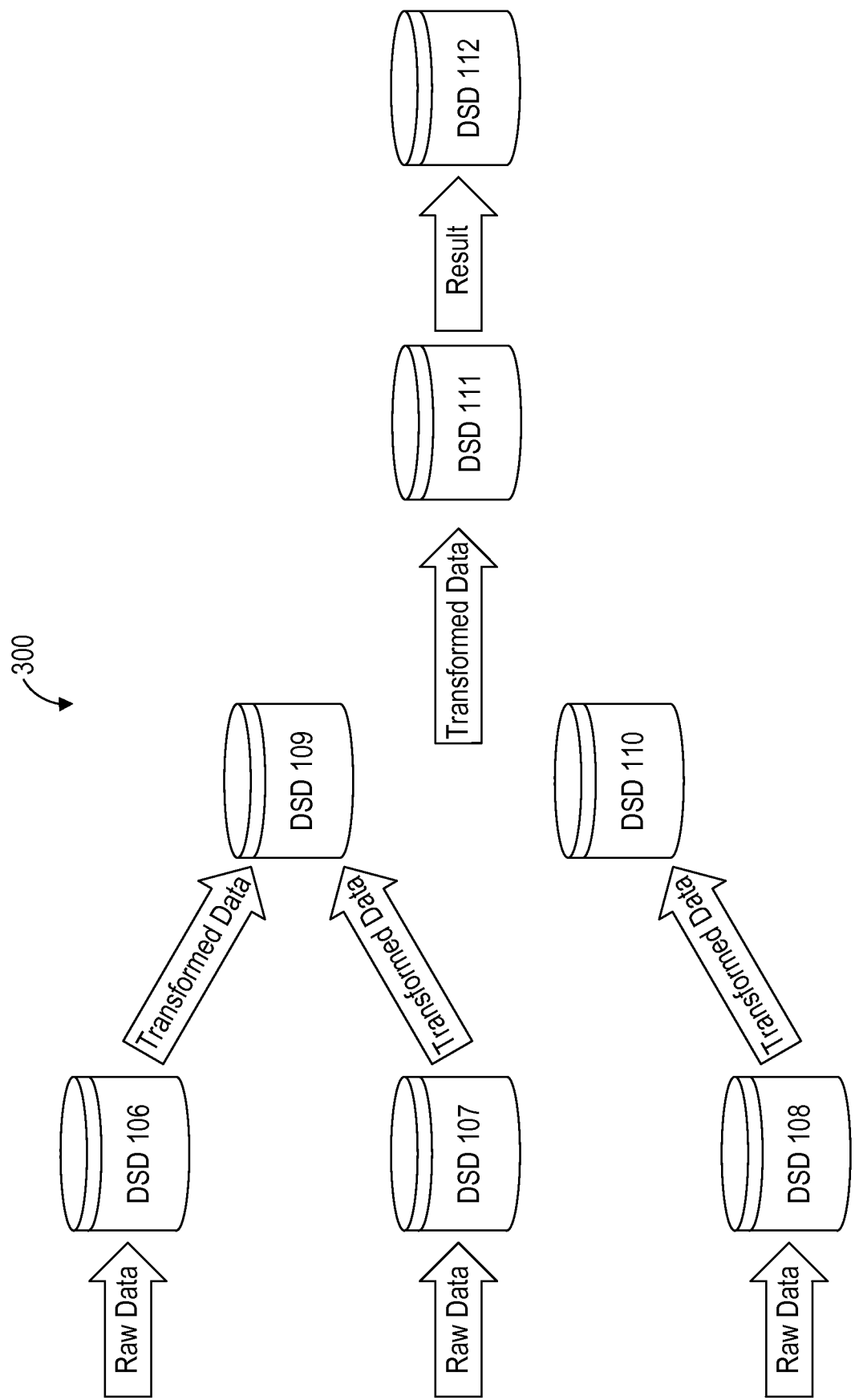
FIG. 12 is a diagram depicting a cluster of DSDs used to perform a MapReduce function according to an embodiment.

FIG. 12 is a diagram depicting cluster 300 of DSDs used to perform a MapReduce function according to an embodiment. As with the example of FIG. 11, host 101 can provide cluster 300 with executable instructions for processing data. The executable instructions can include, for example, an executable image, protocol rules, or other executable instructions set by host 101 that can be used by an off-load interface 20 at each of the DSDs in cluster 300.

As shown in FIG. 12, the DSDs in cluster 300 are arranged in three tiers to perform a MapReduce function. A MapReduce function can provide for parallel processing of a large data set to search, analyze, log, and/or return a reduced data set. In the example of FIG. 12, raw data is mapped using a first tier of DSDs to output transformed data to a second tier of DSDs which shuffles or redistributes the transformed data to a third tier of DSDs to perform a reduce function. Other embodiments may include more than three tiers of DSDs or may include more DSDs than those shown in FIG. 12 for each tier.

In one example, DSDs 106, 107, and 108 store the raw data and transforms the raw data using a process such as the process described above in FIG. 10B and sends the transformed data to DSDs 109 and 110 in a second tier of cluster 300. DSDs 109 and 110 store the transformed data and further transform the data and directs the transformed data to DSD 111 in a third tier of cluster 300 which reduces the transformed data to a result that is stored in DSD 112.

In one example, the MapReduce function can be used to identify certain combinations of DNA from sets of raw DNA sequences received in the first tier of cluster 300. The second tier of cluster 300 can be used to further refine the identified DNA combinations based on a narrower set of characteristics before sending the refined data set to the third tier for further reducing. Since each set of DNA combinations is stored on a DSD in cluster 300, a different reduction can subsequently be performed using a different set of characteristics at different tiers. A similar application of a MapReduce function can be used, for example, with chemical, bacterial, or viral analysis.

In another example, the MapReduce function can be used for photo analytics where raw photos are stored in the first tier, and search criteria at the first tier is used to filter the raw photos to a reduced set of photos that are then stored in the second tier. The reduced set stored in the second tier can be further reduced for example by location using cell phone logistical information applied by an off-load interface at DSD 111.

In another example, the MapReduce function can be used to analyze shopping behaviors. Raw data stored in the first tier can include data for all shoppers, including items purchased, and the time of purchase. The transformed data stored in the second tier can include data for shoppers who bought a particular item during a certain time period. The third tier of DSD 111 can store transformed data identifying which of the shopping data stored in the second tier includes items purchased with a coupon. In such an example, the resulting data stored in DSD 112 can be used to target marketing to particular shoppers.

In another example, cluster 300 can be used for an Internet or Intranet search engine function where the first tier of DSDs store a raw set of searches parsed by user, the second tier stores transformed data reduced to the most frequent searches and the most frequent users to enable faster retrieval, and the third tier can be used to further reduce the transformed data to very high frequency searches such as "viral" hits.

In yet another example, the MapReduce function of cluster 300 can be used to perform sound analysis. The first tier could store all sounds, from all sources and locations, the second tier could store a subset of the raw data based upon search criteria (i.e., known voice matching or recognition, background noise identification, or machine noise recognition), and the third tier of DSD 111 may match the data stored in the second tier to a particular sound or location for a criminal investigation.

As demonstrated by the five examples provided above, many more example applications of cluster 300 with a MapReduce are possible within the scope of this disclosure.

Figure 13:
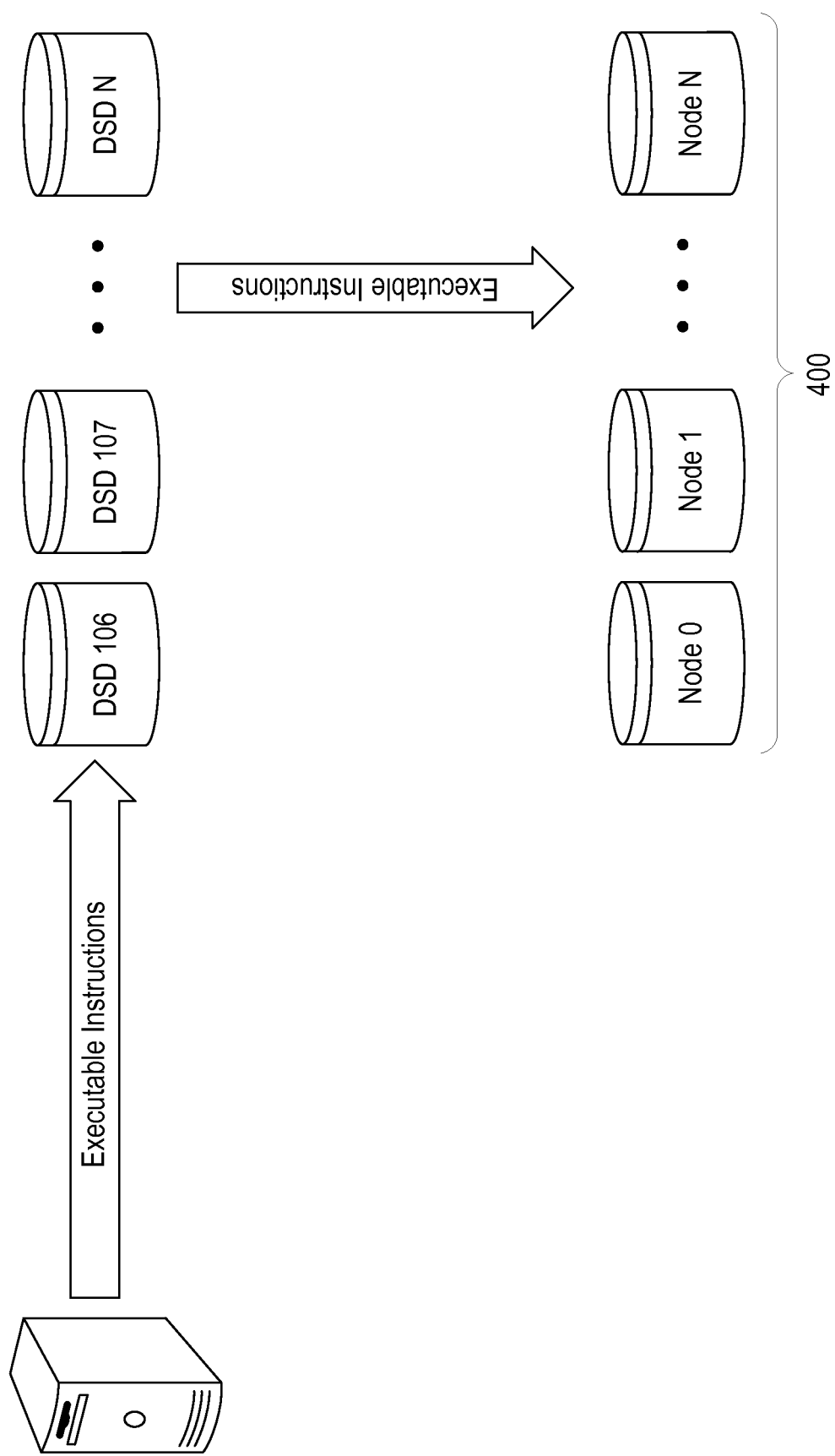
FIG. 13 is a diagram depicting a cluster of DSDs where each DSD serves as a compute node according to an embodiment.

FIG. 13 is a diagram depicting a cluster 400 of DSDs where each DSD serves as a compute node according to an embodiment. As shown in FIG. 13, host 101 provides cluster 400 with executable instructions to configure each of the DSDs in cluster 400 (i.e., DSD 106 and DSDs 107 to DSD N) to serve as a compute node. The executable instructions can include, for example, an executable image, protocol rules, or other executable instructions set by host 101 that can be used by an off-load interface 20 at each of the DSDs in cluster 400, and can cause a processor of each DSD to transform the DSD into a compute node such as, for example, a Hadoop node or an OpenStack node. The compute nodes can then operate independently or in coordination with one or more other nodes to form a distributed system.

As discussed above, by using an off-load interface at a DSD it is ordinarily possible to improve processing efficiency and network traffic in a distributed system by taking advantage of local data processing. In addition, the use of a off-load interface as described above can allow for a wider variety of devices, software, and functions to be performed in a network of DSDs.

Other Embodiments

Figure 15:
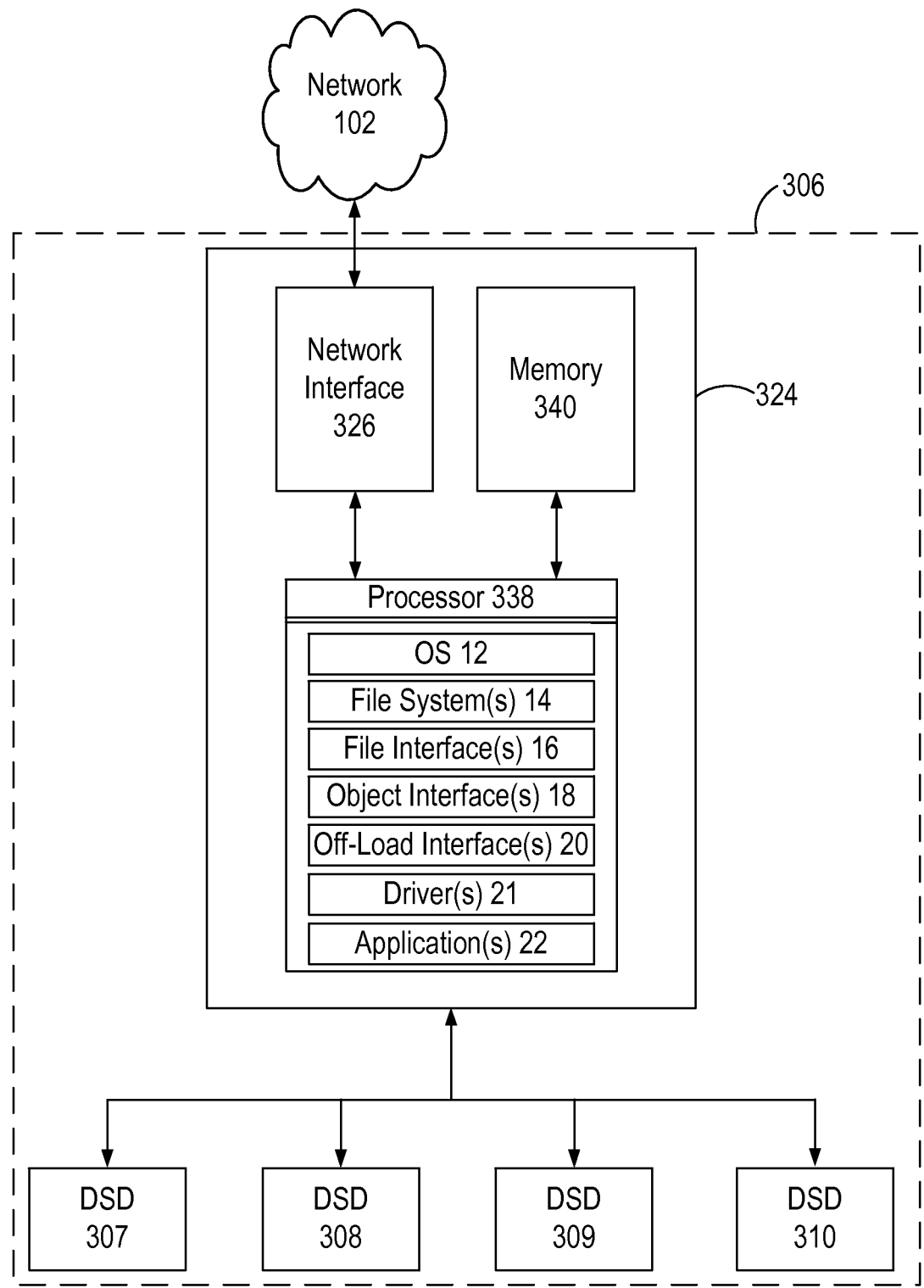
FIG. 15 is a block diagram of a data storage system including a plurality of DSDs according to an embodiment.

FIGS. 14 and 15 depict alternative data storage environments for implementing the processes described above. Those of ordinary skill in the art will appreciate that other embodiments may include more or less components than those depicted in FIGS. 14 and 15.

FIG. 14 is a block diagram depicting data storage system 206 where SoC 220 is shared among a plurality of HDAs including HDAs 244, 246, 248, and 250 according to an embodiment. Each HDA can include at least one rotating magnetic disk and at least one head for accessing data from a corresponding disk surface without certain circuitry that is shared among the HDAs. By sharing processing and/or memory resources among a plurality of HDAs, it is ordinarily possible to reduce the cost of storing data and to make better use of processing and memory resources.

As shown in FIG. 14, bridge 224 includes network interface 226 for communicating on network 102, memory 240, and processor 238 for executing certain software discussed above. Network interface 226 can, for example, allow processor 238 to communicate on network 102 using TCP/IP over Ethernet or WiFi. Memory 240 can represent a volatile memory of data storage system 206 (e.g., DRAM) for temporarily storing data used by bridge 224 or SoC 220. In other embodiments, memory 240 can be an NVM such as MRAM.

In the example of FIG. 14, processor 238 is configured to execute application OS 12, file system(s) 14, file interface(s) 16, object interface(s) 18, off-load interface(s) 20, driver(s) 21, and application(s) 22. Application(s) 22 can include applications developed by a manufacturer of data storage system 206 and/or independently developed applications that have been downloaded from network 102. For example, data storage system 206 may receive computer-executable instructions via network interface 226 and then execute the computer-executable instructions to create an application 22. In some implementations, an SDK (e.g., SDK 19 shown in FIG. 3) could be made available to allow users on network 102 to develop their own applications to run on data storage system 206.

Driver(s) 21 or application(s) 22 can include data storage related applications such as "sniff and store" applications to collect information about data use, a user interface for operating data storage system 206, an HDA health monitoring for monitoring HDA reliability and/or the migration of data to another DSD on network 102 or NVM within data storage system 206 before losing data, data encryption, data compression, an erasure coding or error correction, directing data for storage in a particular NVM of data storage system 206 (e.g., tiered storage), deduplication of data stored in data storage system 206, or mirroring data (e.g., data backup) among HDAs of data storage system 206.

In addition, driver(s) 21 or application(s) 22 can customize data storage system 206 for specific uses such as streaming certain types of media over network 102, or configuring data storage system 206 to operate as a DVR or media server. Driver(s) 21 or application(s) 22 can also provide for certain network functions on network 102 such as bit coin mining, identification of another DSD or data storage system on network 102 and identification of data stored in another DSD or data storage system, migration or copying of data from a failed DSD or HDA NVM to another DSD or HDA NVM on network 102, or the rerouting of data to other DSDs in the network based on environmental conditions such as vibration or temperature.

Data included in mapping 24, write pointers 26, command queue 28, buffer 30, or data to be stored in or retrieved from HDAs can be stored in memory 240 so that the data can be accessed by processor 238 during execution of software programs to the extent that such software programs have a need to access and/or modify the data. In addition to shifting processing from a host on network 102 to data storage system 206 with off-load interface(s) 20, running application OS 12 at processor 238 can allow for shifting tasks to file system(s) 14, driver(s) 21, and/or application(s) 22 that may otherwise have been performed by firmware of data storage system 206 (e.g., controller firmware 11). In addition to the tasks mentioned above of data encryption, data compression, erasure coding or other error correction, the direction of data for storage in HDAs based on data attributes, the direction of data for storage in different zones of NVM (e.g., SMR zones and CMR zones), deduplication of data, and data mirroring, processor 238 can use mapping 24, write pointers 26, command queue 28, and buffer 30 as described above for the embodiment of FIG. 1 to perform other tasks related to the management of HDAs in data storage system 206. By moving such tasks from controller firmware 11 to a file system 14, application 22, or driver 21 executed on processor 238, the tasks can be more easily modified in the field. For example, a new HDA can be added as part of data storage system 206 that may require or benefit from a new driver 21 or new application 22 that can be more easily added to bridge 224 than by changing a firmware of data storage system 206. In addition, shifting more tasks to software operating on processor 238 from firmware of data storage system 206 can ordinarily allow for a simplified firmware.

Unlike the example embodiment of FIG. 1, processor 238 interfaces with processor 239 of SoC 220 that executes interface firmware 15 for interfacing with processor 238. The interface between processor 238 and processor 239 can be accomplished using a bus standard, such as for example, SATA, PCIe, SCSI, or SAS. In other implementations, processor 238 may use an object interface 18 or a custom interface such as a customized file system 14 or off-load interface 20 to provide processor 239 with, for example, device block addresses indicating a physical location for retrieving or storing data objects in HDAs 244, 246, 248, or 250.

SoC 220 also includes processor 241 for executing controller firmware 11 and processor 242 for executing servo firmware 10. In other embodiments, two or more of processors 239, 241, or 242 can be combined into a single processor. In the example of FIG. 14, each of processor 241 and 242 communicate with HDAs 244, 246, 248, and 250 to retrieve data from the HDAs and store data in the HDAs. In this regard, SoC 220 may include one or more multiplexers (not shown) for sending signals such as VCM control signals 34, SM control signals 38, or read/write signals 36 to each of HDAs 244, 246, 248, and 250. Processors 241 and 242 can be configured to interface with one HDA at a time or with multiple HDAs at the same time depending on different design criteria for data storage system 206. In one example, processors 241 and 242 may only interface with one HDA at a time to conserve power in a data archive implementation. In another example, processors 241 and 242 may interface with multiple HDAs at the same time to offer quicker access to mirrored data stored on rotationally synchronized disks in different HDAs.

In this regard, each of HDAs 244, 246, 248, and 250 can include one or more rotating magnetic disks such as disk 150 in FIG. 1, together with one or more heads for reading and writing data on a disk surface. As with the embodiment of FIG. 1, the heads used in HDAs 244, 246, 248, and 250 can be positioned relative to a corresponding disk surface by moving an actuator with a VCM.

FIG. 15 is a block diagram depicting data storage system 306 where controller 324 is shared among a plurality of DSDs including DSDs 307, 308, 309, and 310 according to an embodiment. In the example embodiment of FIG. 15, processor 338 interfaces with DSDs 307, 308, 309, and 310. The interface between processor 338 and the DSDs can be accomplished using a bus standard, such as for example, SATA, PCIe, SCSI, or SAS. In other implementations, processor 338 may use an object interface 18 or a custom interface such as a customized file system 14, off-load interface 20, or driver 21 to interface with one or more of DSDs 307, 308, 309, and 310. In this regard, processor 338 may interface with different DSDs using different interfaces. For example, processor 338 may use a file system 14 to interface with DSD 307, a file interface 16 to interface with DSD 308, an object interface to interface with DSD 309, and an off-load interface 20 or driver 21 to interface with DSD 310.

As shown in FIG. 15, controller 324 includes network interface 326 for communicating on network 102, memory 340, and processor 338. Network interface 326 can, for example, allow processor 338 to communicate on network 102 using TCP/IP over Ethernet or WiFi. Memory 340 can represent a volatile memory of data storage system 206 (e.g., DRAM) for temporarily storing data used by controller 324. In other embodiments, memory 340 can be an NVM such as MRAM.

In the example of FIG. 15, processor 338 is configured to execute application OS 12, file system(s) 14, file interface(s) 16, object interface(s) 18, off-load interface(s) 20, driver(s) 21, and application(s) 22. Application(s) 22 can include applications developed by a manufacturer of data storage system 306 and/or independently developed applications that have been downloaded from network 102.

Similar to the driver(s) 21 and application(s) 22 discussed above, driver(s) 21 or application(s) 22 can include data storage related applications such as "sniff and store" applications, DSD health monitoring and/or the migration of data to another DSD on network 102 or DSD within data storage system 306, data encryption, data compression, erasure coding or error correction, directing data for storage in a particular NVM of data storage system 306 based on attributes of the data (e.g., tiered storage), deduplication of data stored in data storage system 306, or mirroring data (e.g., data backup or Redundant Array of Independent Disks (RAID) applications).

In addition, driver(s) 21 or application(s) 22 can customize data storage system 306 for specific uses such as streaming certain types of media over network 102, or configuring data storage system 306 to operate as a DVR or media server. Driver(s) 21 or application(s) 22 can also provide for certain network functions on network 102 such as bit coin mining, identification of another DSD or data storage system on network 102 and identification of data stored in another DSD or data storage system, migration or copying of data from a failed DSD NVM to another DSD NVM on network 102, or the rerouting of data to other DSDs in the network or within data storage system 306 based on environmental conditions such as vibration or temperature. In this case, a sensor such as sensor 122 can be located at each of DSDs 307, 308, 309, and 310, or at selected DSDs in data storage system 306, to determine environmental conditions at different DSDs.

Data included in mapping 24, write pointers 26, command queue 28, buffer 30, or data to be stored in or retrieved from NVM can be stored in memory 340 so that the data can be accessed by processor 338 during execution of software programs to the extent that such software programs have a need to access and/or modify the data. In addition to shifting processing from a host on network 102 to data storage system 306 with off-load interface(s) 20, running application OS 12 at processor 338 can allow for shifting tasks to file system(s) 14, driver(s) 21, and/or application(s) 22 that may otherwise have been performed by firmware (e.g., controller firmware 11) at DSDs in data storage system 306. By moving such tasks from a controller firmware to a file system 14, application 22, or driver 21 executed on processor 338, the DSD firmware can be simplified and tasks for maintaining data storage system 306 can be more easily modified in the field. In one such example, a new DSD with a different type of NVM can be added to data storage system 306 and a new driver 21 or application 22 executed by processor 338 can be added for managing the different type of NVM.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Data Storage Device (DSD), comprising:
a Non-Volatile Memory (NVM) for storing data and executable instructions comprising executable instructions for an application Operating System (OS), an object interface and a file interface different from the object interface;
a first processor configured to execute a firmware to retrieve data from the NVM and store data in the NVM; and
a second processor different from the first processor and configured to:
load the application OS, the object interface and the file interface from the NVM into a memory;
execute the application OS from the memory for interfacing between the first processor and a host device external to and configured to be connected to the DSD via a network;
execute the object interface from the memory for retrieving or storing data as data objects in the NVM;
execute the file interface from the memory for retrieving or storing data as files in the NVM;
send object-based commands to the first processor using the object interface and the application OS such that the first processor retrieves the data objects from the NVM or stores the data objects in the NVM; and
send file-based commands to the first processor using the file interface and the application OS such that the first processor retrieves the files from the NVM or stores the files in the NVM,
wherein both of the first and second processors are located inside the DSD,
wherein execution of the application OS causes the second processor to segregate a user space of the NVM from a kernel space of the NVM such that the file interface is executed in the kernel space, and the object interface is executed in the user space, wherein the user space comprises one or more libraries, wherein the object interface is configured to access the libraries in the user space,
wherein the executable instructions further comprise an off-load interface, wherein the second processor is further configured to execute the off-load interface to shift at least some of host device processing from the external host device to the second processor, and wherein the host device processing to be shifted comprises transforming data stored in the NVM memory and sending the transformed data to another DSD.

2. The DSD of claim 1, wherein the first processor and the second processor form part of a System on a Chip (SoC) of the DSD.

3. The DSD of claim 1, wherein the first processor and the second processor are further configured to interface using a custom interface executed by the second processor.

4. The DSD of claim 1, further comprising a network interface, wherein the second processor is further configured to communicate on the network via the network interface.

5. The DSD of claim 4, wherein the second processor is further configured to:
receive computer-executable instructions from a device on the network via the network interface; and
execute the computer-executable instructions to install an application or interface for execution by the second processor.

6. The DSD of claim 4, wherein the second processor is further configured to monitor at least one indicator of a reliability of another DSD in the network for storing data.

7. The DSD of claim 4, wherein the second processor is further configured to identify data stored on another DSD in the network.

8. The DSD of claim 4, further comprising a sensor for detecting an environmental condition of the DSD; and wherein the second processor is further configured to:
receive an input from the sensor indicating an environmental condition of the DSD;
determine whether the input exceeds a threshold; and
if the input exceeds the threshold, redirect at least one command to store data in the NVM to another DSD on the network.

9. The DSD of claim 1, wherein the second processor is further configured to execute a file system for accessing files stored in the NVM.

10. The DSD of claim 1, wherein the NVM includes a rotating magnetic disk, and wherein the DSD further comprises:
a head for reading data from the rotating magnetic disk and for writing data on the rotating magnetic disk; and
a third processor configured to control rotation of the rotating magnetic disk and positioning of the head in relation to the rotating magnetic disk.

11. The DSD of claim 1, wherein the second processor is further configured to map logical addresses for data to physical addresses corresponding to physical locations for storing the data in the NVM.

12. The DSD of claim 11, wherein the second processor is further configured to perform address indirection in mapping the logical addresses to the physical addresses to allow for remapping of the logical addresses to new physical addresses in the NVM.

13. The DSD of claim 1, wherein the NVM includes at least one rotating magnetic disk including a zone of overlapping tracks for storing data, and wherein the second processor is further configured to maintain a write pointer indicating a location in the zone for writing data.

14. The DSD of claim 1, wherein the second processor is further configured to reorder pending commands in a command queue for storing data in the NVM.

15. The DSD of claim 1, wherein the NVM includes a plurality of disk assemblies, each disk assembly of the plurality of disk assemblies including at least one rotating magnetic disk and at least one head for reading data from the at least one rotating magnetic disk and for writing data on the at least one rotating magnetic disk.

16. The DSD of claim 1, wherein the NVM includes a solid-state memory and a rotating magnetic disk, and wherein the second processor is further configured to direct data for storage in the solid-state memory and/or the rotating magnetic disk based on attributes of the data.

17. A method for operating a Data Storage Device (DSD) including a Non-Volatile Memory (NVM) for storing data and executable instructions comprising executable instructions for an application Operating System (OS), an object interface and a file interface different from the object interface, a first processor, and a second processor different from the first processor, the method comprising:
executing a firmware using the first processor for retrieving data from the NVM and storing data in the NVM;

loading the application OS, the object interface and the file interface from the NVM into a memory using the second processor;

executing the application OS from the memory using the second processor, wherein the second processor uses the application OS to interface with the first processor and a host device external to and configured to be connected to the DSD via a network;

executing the object interface from the memory by the second processor for retrieving or storing data as data objects in the NVM;

executing the file interface from the memory by the second processor for retrieving or storing data as files in the NVM;

sending object-based commands to the first processor using the object interface and the application OS such that the first processor retrieves the data objects from the NVM or stores the data objects in the NVM; and sending file-based commands to the first processor using the file interface and the application OS such that the first processor retrieves the files from the NVM or stores the files in the NVM, wherein both of the first and second processors are located inside the DSD, wherein execution of the application OS causes the second processor to segregate a user space of the NVM from a kernel space of the NVM such that the file interface is executed in the kernel space, and the object interface is executed in the user space, wherein the user space comprises one or more libraries, wherein the object interface is configured to access the libraries in the user space, wherein the executable instructions further comprise an off-load interface, wherein the second processor is further configured to execute the off-load interface to shift at least some of host device processing from the external host device to the second processor, and wherein the host device processing to be shifted comprises transforming data stored in the NVM memory and sending the transformed data to another DSD.

18. The method of claim 17, wherein the first processor and the second processor form part of a System on a Chip (SoC) of the DSD.

19. The method of claim 17, wherein the first processor and the second processor interface using a custom interface executed by the second processor.

20. The method of claim 17, further comprising using the second processor to communicate on the network via a network interface of the DSD.

21. The method of claim 20, further comprising: receiving computer-executable instructions from a device on the network via the network interface; and
executing the computer-executable instructions to install an application or interface for execution by the second processor.

22. The method of claim 20, further comprising using the second processor to monitor at least one indicator of a reliability of another DSD in the network for storing data.

23. The method of claim 20, further comprising using the second processor to identify data stored on another DSD in the network.

24. The method of claim 20, further comprising:
receiving an input from a sensor indicating an environmental condition of the DSD;
determining whether the input exceeds a threshold; and
if the input exceeds the threshold, redirecting at least one command to store data in the NVM to another DSD on the network.

25. The method of claim 17, further comprising using the second processor to execute a file system for accessing files stored in the NVM.

26. The method of claim 17, wherein the NVM includes a rotating magnetic disk, and wherein the DSD includes a third processor configured to control rotation of the rotating magnetic disk and positioning of a head in relation to the rotating magnetic disk.

27. The method of claim 17, further comprising using the second processor to map logical addresses for data to physical addresses corresponding to physical locations for storing the data in the NVM.

28. The method of claim 27, further comprising performing address indirection in mapping the logical addresses to the physical addresses to allow for remapping of the logical addresses to new physical addresses in the NVM.

29. The method of claim 17, wherein the NVM includes at least one rotating magnetic disk including a zone of overlapping tracks for storing data, and wherein the method further comprises using the second processor to maintain a write pointer indicating a location in the zone of overlapping tracks for writing data.

30. The method of claim 17, further comprising using the second processor to reorder pending commands in a command queue for storing data in the NVM.

31. The method of claim 17, wherein the NVM includes a plurality of disk assemblies, each disk assembly of the plurality of disk assemblies including at least one rotating magnetic disk and at least one head for reading data from the at least one rotating magnetic disk and for writing data on the at least one rotating magnetic disk.

32. The method of claim 17, wherein the NVM includes a solid-state memory and a rotating magnetic disk, and wherein the method further comprises using the second processor to direct data for storage in the solid-state memory and/or the rotating magnetic disk based on attributes of the data.

33. A non-transitory computer readable medium storing computer executable instructions for operating a Data Storage Device (DSD) including a Non-Volatile Memory (NVM) for storing data and executable instructions comprising executable instructions for an application Operating System (OS), an object interface and a file interface different from the object interface, a first processor, and a second processor different from the first processor, wherein when the computer executable instructions are executed by the second processor, the computer executable instructions cause the second processor to:
load the application OS, the object interface and the file interface from the NVM into a memory;
execute the application OS from the memory for interfacing with the first processor and a host device external to and configured to be connected to the DSD via a network;
execute the object interface from the memory for retrieving or storing data as data objects in the NVM;
execute the file interface from the memory for retrieving or storing data as files in the NVM;
send object-based commands to the first processor using the object interface and the application OS such that the first processor retrieves the data objects from the NVM or stores the data objects in the NVM; and send file-based commands to the first processor using the file interface and the application OS such that the first processor retrieves the files from the NVM or stores the files in the NVM, wherein both of the first and second processors are located inside the DSD, wherein execution of the application OS causes the second processor to segregate a user space of the NVM from a kernel space of the NVM such that the file interface is executed in the kernel space, and the object interface is executed in the user space, wherein the user space comprises one or more libraries, wherein the object interface is configured to access the libraries in the user space, wherein the executable instructions further comprise an off-load interface, wherein the second processor is further configured to execute the off-load interface to shift at least some of host device processing from the external host device to the second processor, and wherein the host device processing to be shifted comprises transforming data stored in the NVM memory and sending the transformed data to another DSD.

34. The DSD of claim 1, wherein the second processor is further configured to use the application OS to:

send object-based commands to the first processor specifying at least one device block address; and send file-based commands to the first processor specifying at least one logical block address.

35. The method of claim 17, wherein in sending object-based commands and file-based commands to the first processor using the application OS executed by the second processor, the method further comprises:

sending object-based commands specifying at least one device block address for data to be retrieved from the NVM or stored in the NVM; and sending file-based commands to the first processor specifying at least one logical block address for data to be retrieved from the NVM or stored in the NVM.

36. The DSD of claim 1, wherein the off-load interface is configured to be executed in the kernel space.

37. The DSD of claim 1, wherein the second processor is further configured to:

receive computer-executable instructions from the external host device, wherein the computer-executable instructions comprise an executable image, protocol rules, or other executable instructions set by the external host device;

execute the computer-executable instructions using the off-load interface to transform data stored in the NVM or data received via the network; and at least one of send the transformed data to another DSD on the network or store the transformed data in the NVM.

38. The DSD of claim 1, wherein the first processor is configured to perform, using the firmware, only retrieving data from the NVM and the second processor is configured to perform other maintenance operations of the NVM comprising at least one of: data encryption, data compression, erasure coding, data deduplication, data mirroring, directing data for storage in the NVM based on attributes of the data, directing data for storage in a conventional magnetic recording (CMR) zone or an shingled magnetic recording (SMR) of the NVM based on attributes of the data, address mapping, maintenance of write pointers, ordering of command queue, or garbage collection using a buffer.

* * * * *